US012074371B2

(12) United States Patent
Hong et al.

(10) Patent No.: US 12,074,371 B2
(45) Date of Patent: Aug. 27, 2024

(54) MILLIMETER WAVE (MMW) REFLECTIVE STRUCTURE AND MMW TRANSMISSION STRUCTURE

(71) Applicants: CORNING INCORPORATED, Corning, NY (US); POSTECH RESEARCH AND BUSINESS DEVELOPMENT FOUNDATION, Gyeongsangbuk-do (KR)

(72) Inventors: Won-bin Hong, Gangnam-gu (KR); Byounggwan Kang, Seoul (KR); Hyung Rae Kim, Asan-si (KR); Kyung-jin Lee, Cheonan-si (KR); Young-no Youn, Sejong-si (KR)

(73) Assignees: CORNING INCORPORATED, Corning, NY (US); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 116 days.

(21) Appl. No.: 17/628,588

(22) PCT Filed: Jul. 15, 2020

(86) PCT No.: PCT/US2020/042101
§ 371 (c)(1),
(2) Date: Jan. 20, 2022

(87) PCT Pub. No.: WO2021/016016
PCT Pub. Date: Jan. 28, 2021

(65) Prior Publication Data

US 2022/0255235 A1 Aug. 11, 2022

(30) Foreign Application Priority Data

Jul. 22, 2019 (KR) ........................ 10-2019-0088535

(51) Int. Cl.
*H01Q 15/14* (2006.01)
*H01Q 1/38* (2006.01)
*H01Q 15/00* (2006.01)

(52) U.S. Cl.
CPC ............... *H01Q 15/14* (2013.01); *H01Q 1/38* (2013.01); *H01Q 15/0013* (2013.01)

(58) Field of Classification Search
CPC ... H01Q 15/14; H01Q 15/0013; H01Q 15/142
See application file for complete search history.

(56) References Cited

U.S. PATENT DOCUMENTS 6,727,787 B2 * 4/2004 Worth ........................ H01P 7/06 333/228
2002/0140624 A1 * 10/2002 Webb ..................... H01Q 15/02 343/754

(Continued)

FOREIGN PATENT DOCUMENTS

JP 2003-078341 A 3/2003
JP 4853329 B2 1/2012

(Continued)

OTHER PUBLICATIONS

International Search Report and Written Opinion of the International Searching Authority; PCT /US2020/042101; dated Oct. 21, 2022; pp. 9; Korean Patent Office.

(Continued)

*Primary Examiner* — Lam T Mai
(74) *Attorney, Agent, or Firm* — Svetlana Z. Short

(57) ABSTRACT

A millimeter-wave reflective structure configured to reflect incident millimeter waves includes: a transparent substrate defining unit cells in the form of a matrix, the transparent substrate having an upper surface; and conductive patterns (Continued)

arranged in the unit cells on the transparent substrate, each of the conductive patterns having a hollow rectangular shape.

20 Claims, 24 Drawing Sheets

(56) References Cited

U.S. PATENT DOCUMENTS

| | | | | |
|---|---|---|---|---|
| 2004/0150311 | A1* | 8/2004 | Jin | H01J 19/24 313/309 |
| 2005/0067007 | A1* | 3/2005 | Toft | H01G 9/2068 136/244 |
| 2010/0002282 | A1* | 1/2010 | Agrawal | G02F 1/155 977/773 |
| 2011/0102297 | A1 | 5/2011 | Ikawa et al. | |
| 2012/0212375 | A1* | 8/2012 | Depree, IV | H01Q 15/0086 977/762 |
| 2013/0229240 | A1 | 9/2013 | Terada et al. | |
| 2018/0054006 | A1* | 2/2018 | Wang | H01Q 21/24 |

FOREIGN PATENT DOCUMENTS

| | | | |
|---|---|---|---|
| JP | 2015-027018 | A | 2/2015 |
| KR | 10-2011-0037262 | A | 4/2011 |
| KR | 10-1161553 | B1 | 7/2012 |
| KR | 10-1401769 | B1 | 5/2014 |

OTHER PUBLICATIONS

Aldo Petosa, et al., "Characterization and Enhancement of the Environment for 5G Millimetre-wave Broadband Mobile Communications", 2018, pp. 1-5.

Guang Liu, et al., "A Millimeter Wave Transparent Transmitarray Antenna Using Meshed Double Circle Rings Elements", National Space Science Center, 2018, pp. 1-5.

* cited by examiner

MILLIMETER WAVE (MMW) REFLECTIVE STRUCTURE AND MMW TRANSMISSION STRUCTURE

CROSS-REFERENCE TO RELATED APPLICATION

This application claims the benefit of priority under 35 U.S.C. § 371 of International Application No. PCT/US2020/042101, filed on Jul. 15, 2020, which claims the benefit of priority under 35 U.S.C. § 119 of Korean Patent Application Serial No. 10-2019-0088535, filed on Jul. 22, 2019, the content of which is relied upon and incorporated herein by reference in its entirety.

BACKGROUND

1. Field

The inventive concept relates to a millimeter wave (mmW) reflective structure, a mmW reflection-directed structure, and a mmW transmission structure.

2. Description of the Related Art

From the beginning of wireless network services, all new-generation services have introduced new features to customers and industry. Mobile phone services and text messages were introduced in $1^{st}$ generation (1G) and $2^{nd}$ generation (2G) communication services, online access platforms using smartphones were established in $3^{rd}$ generation (3G) communication services, and today's fast wireless networks were introduced in $4^{th}$ generation (4G) communication services. However, 4G communication services show functional limitations in terms of ultra-low latency and ultra connection.

Accordingly, the introduction of $5^{th}$ generation (5G) communication services that correspond to a new concept of wireless network services has begun, starting with the launch of 5G services by SK-Telecom, which is a Korean telecom operator, on Apr. 5, 2019. 5G communication services are expected to handle 1000 times more data traffic and be 10 times faster than 4G communication services, and are expected to be the foundation for a variety of next-generation technologies, such as virtual reality, augmented reality, autonomous driving, and Internet of Things (IoT).

SUMMARY

The inventive concept provides a millimeter wave (mmW) reflective structure, a mmW reflection-directed structure, and a mmW transmission structure.

However, the technical goal of the inventive concept is not limited thereto, and other technical goals may be apparent from the following description.

Additional aspects will be set forth in part in the description which follows and, in part, will be apparent from the description, or may be learned by practice of the presented embodiments.

According to one or more embodiments, a millimeter wave (mmW) reflective structure configured to reflect incident millimeter waves is provided. The mmW reflective structure may include: a transparent substrate in which unit cells in the form of a matrix are defined, the transparent substrate having an upper surface parallel to first and second directions that are orthogonal to each other; and conductive patterns arranged in the unit cells on the transparent substrate, each of the conductive patterns having a hollow rectangular shape.

Centers of the unit cells may match centers of the conductive patterns.

Each of the unit cells may be square, wherein lengths of each of the unit cells in the first and second directions may be about 3 mm to about 5 mm.

A size of each of the conductive patterns may decreases in a first direction.

Transmittance of visible light in the mmW reflective structure may be about 70% or more.

According to one or more embodiments, a millimeter wave (mmW) reflection-directed structure configured to direct incident millimeter waves in a set direction is provided. The mmW reflection-directed structure may include: a transparent substrate in which unit cells positioned to form a matrix are defined, the transparent substrate having an upper surface parallel to first and second directions that are orthogonal to each other; and conductive patterns arranged in the unit cells, wherein the conductive patterns may be formed in a mesh structure.

Each of the unit cells may have edges parallel to the first direction or the second direction.

Each of the unit cells may include a mesh region in which the conductive pattern is formed and a transparent region in which the conductive pattern is not formed.

A width of the mesh region may be about 0.1 mm to about 2.0 mm.

Lengths of the mesh region in the first and second directions may be about 1.5 mm to about 5 mm.

The mesh region may be a hollow square region when viewed in a direction perpendicular to the transparent substrate.

The conductive pattern may include: a plurality of first conductive lines inclined with respect to the first and second directions and parallel to each other; and a plurality of second conductive lines intersecting the plurality of first conductive lines and parallel to each other.

Vertical thicknesses of the plurality of first and second conductive lines may be about 0.2 micrometers (μm) to about 2 μm.

Widths of the plurality of first and second conductive lines may be about 1 μm to about 10 μm.

The upper surface of the transparent substrate, which is surrounded and exposed by the plurality of first and second conductive lines, may have a diamond shape.

A length of the diamond shape in the first direction may be about 200 μm to about 400 μm.

A length of the diamond shape in the second direction may be about 300 μm to about 1200 μm.

A size of the conductive pattern may decrease in the first direction.

According to one or more embodiments, a millimeter wave (mmW) transmission-directed structure configured to direct incident millimeter waves in a set direction is provided. The mmW transmission-directed structure may include: a transparent substrate in which unit cells are defined in a matrix, the transparent substrate having an upper surface parallel to first and second directions which are orthogonal to each other; and conductive patterns respectively arranged in the unit cells and having a mesh structure, wherein a mesh region in which one of the conductive patterns is formed may be defined in each of the unit cells, and an area ratio of the mesh region to each of the unit cells may be about 50% or more.

The mesh structure may have a diamond shape.

The mesh region may occupy an edge and a central portion of each of the unit cells.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
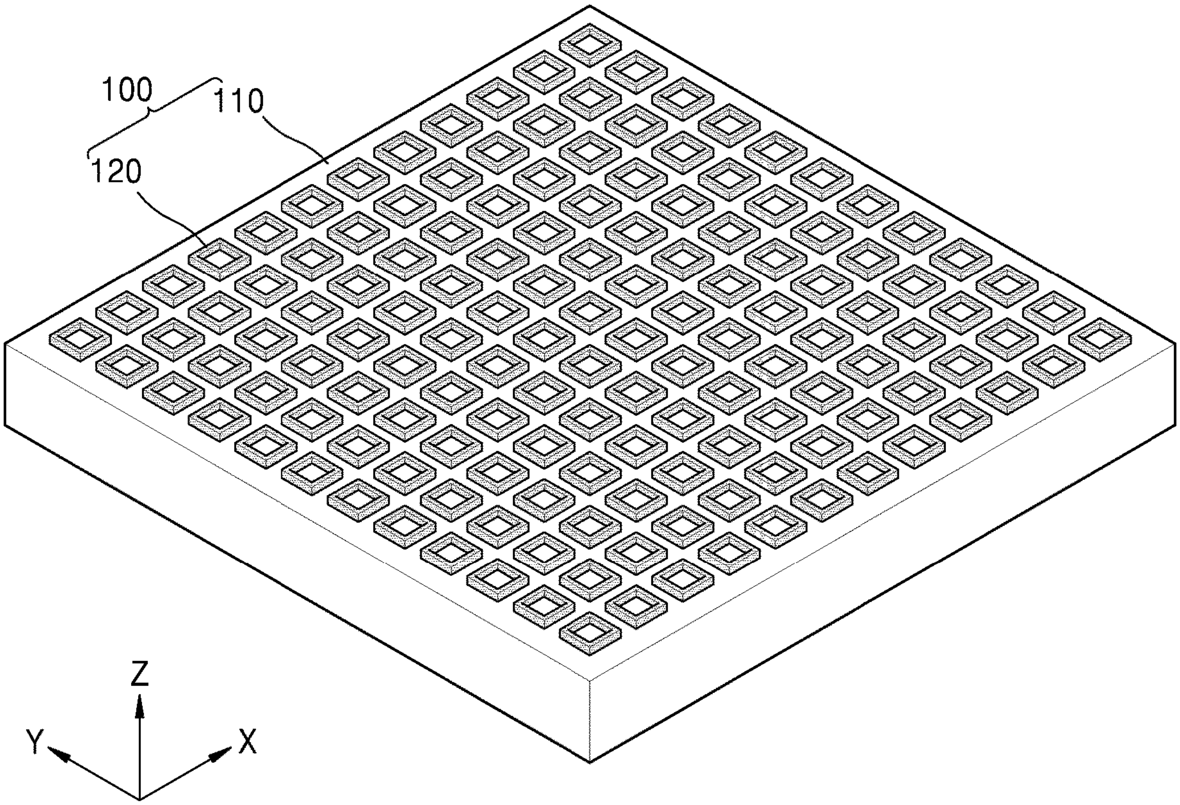
FIGS. 1A and 1B are a perspective view and a plan view, respectively, for describing a millimeter wave (mmW) reflective structure according to embodiments.

The disclosure will now be described more fully with reference to the accompanying drawings, in which example embodiments are shown. The subject matter of the disclosure may, however, be embodied in many different forms and should not be construed as being limited to the example embodiments set forth herein. Rather, these embodiments are provided so that the disclosure will convey the subject matter to those skilled in the art. In the drawings, the thicknesses of layers and regions may be exaggerated for clarity. Wherever possible, like reference numerals in the drawings will denote like elements. Therefore, the disclosure is not limited by relative sizes or intervals as shown in the accompanied drawings.

While such terms as "first," "second," etc., may be used to describe various components, such components are not limited to the above terms. The above terms are used only to distinguish one component from another. For example, a first component may indicate a second component or a second component may indicate a first component without conflicting.

The terms used herein in various example embodiments are used to describe example embodiments only, and should not be construed to limit the various additional embodiments. Singular expressions, unless defined otherwise in contexts, include plural expressions. The terms "comprises" or "may comprise" used herein in various example embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof. Also, expressions such as "at least one of", when preceding a list of elements, modify the entire list of elements and do not modify the individual elements of the list.

When a certain embodiment may be implemented differently, a specific process order may be performed differently from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. As used herein, the term "and/or" includes any and all combinations of one or more of the associated listed items.

One of the main technologies that enables 5th generation (5G) communication service (hereinafter, referred to as 5G) is the use of a millimeter wave (hereinafter, referred to as mmW). Today, electronic devices including mobile phones in the 4th generation long-term evolution (4G LTE) era use electromagnetic waves at frequencies below about 2.5 GHz. However, the frequency band around 2.5 GHz is now saturated due to increased communication demand. Accordingly, wireless communication using a mmW having a frequency in the band of about 2.5 GHz to about 300 GHz, which has not been used for wireless communication, has been studied. Due to the use of the band of about 2.5 GHz to about 300 GHz, the wireless communication using the mmW may provide greater bandwidth than communications using electromagnetic waves at frequencies below about 2.5 GHz and may dramatically increase the number of available channels.

Compared to the existing wireless communication frequency band, a mmW used for 5G communication increases the straightness of radio wave and decreases the diffraction of the radio wave, due to the short wavelength of the mmW. This results in shadow areas of wireless communication radio waves in non line of sight (NLoS) and, in severe cases, disruption of a radio communications channel.

Existing repeater systems, which are used to reduce shadow areas of radio waves and form stable wireless communication channels, include three-dimensional reflectors. The three-dimensional reflectors require complex manufacturing processes, resulting in high production costs and high volume, and thus are constrained by physical spaces. In addition, the three-dimensional reflectors reflect radio waves of all frequencies at the same angle according to a specific angle of incidence according to the law of reflection and thus have a limit in terms of frequency selectivity.

As an alternative to this, a frequency selective surface (FSS) including a transparent substrate may be provided. Embodiments of the inventive concept relate to a millimeter band wireless communication system utilizing the FSS as a repeater.

Figure 1B:
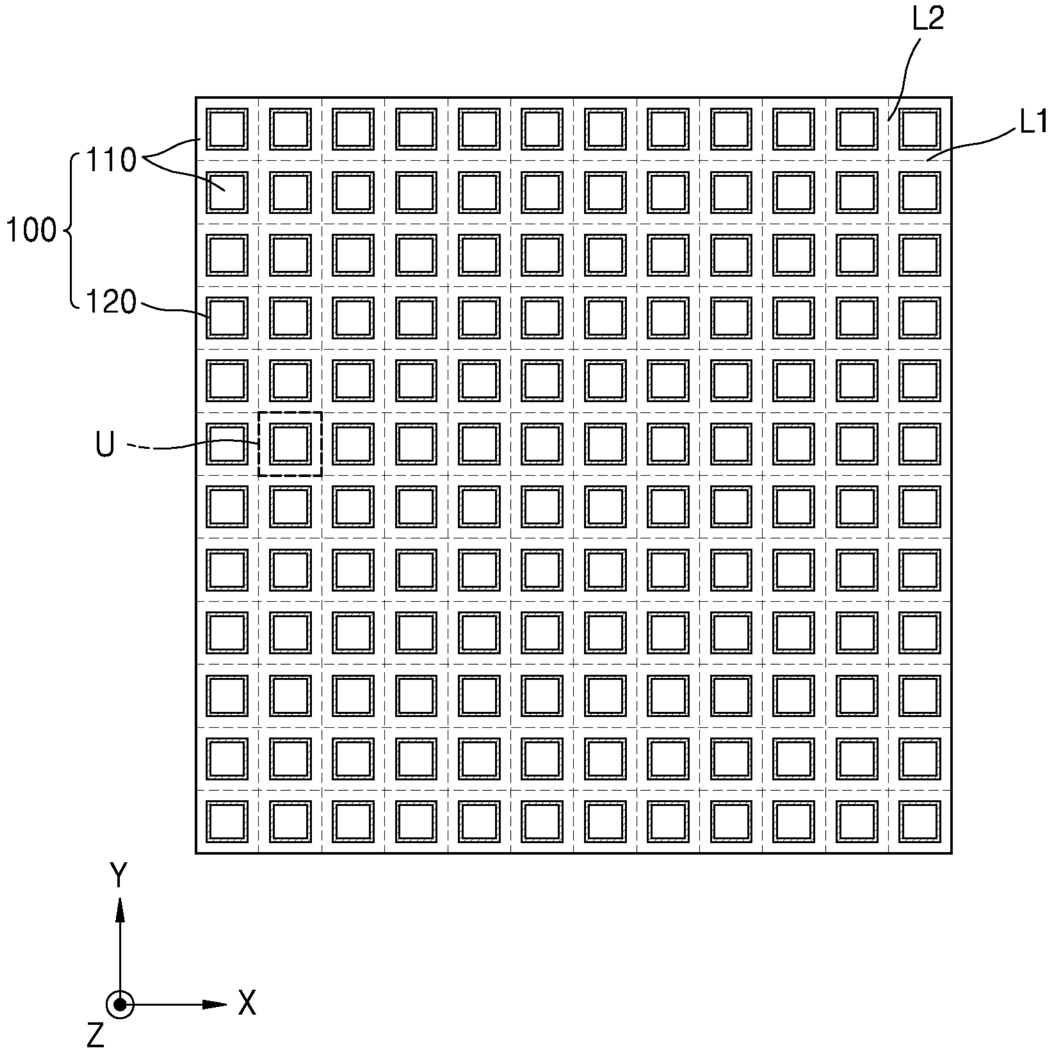

FIGS. 1A and 1B are a perspective view and a plan view, respectively, for describing a mmW reflective structure 100 according to embodiments.

Figure 1C:
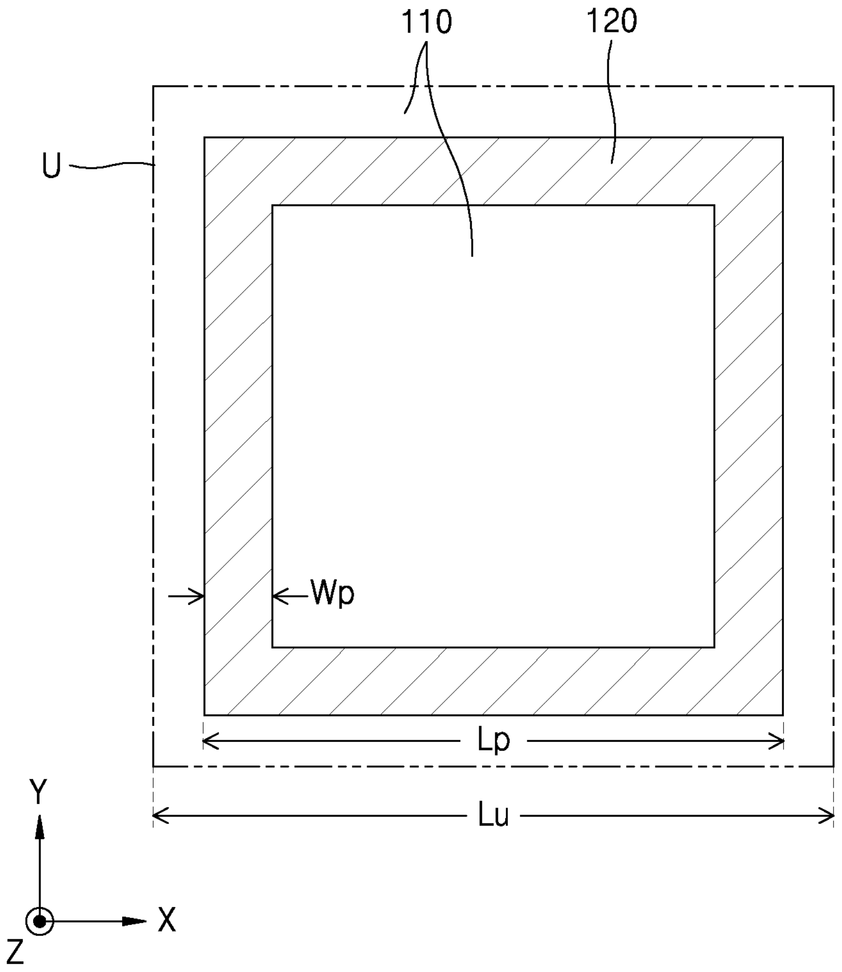
FIGS. 1C and 1D are a partial plan view and a conceptual diagram, respectively, for describing a unit cell included in the mmW reflective structure.
Figure 1D:
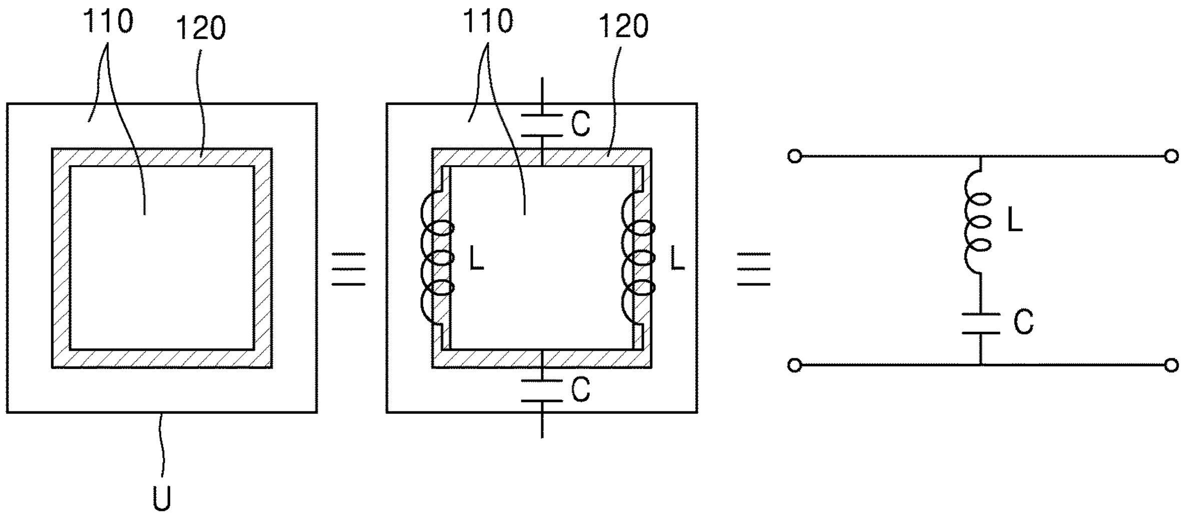

FIGS. 1C and 1D are a partial plan view and a conceptual diagram, respectively, for describing a unit cell U included in the mmW reflective structure 100.

Referring to FIGS. 1A to 1C, the mmW reflective structure 100 may include a transparent substrate 110 and conductive patterns 120 formed on the transparent substrate 110. In some cases, an adhesive layer for bonding the transparent substrate 110 to the conductive patterns 120 may be additionally provided between the transparent substrate 110 and the conductive patterns 120. In this case, the adhesive layer may include a metal such as titanium (Ti), but is not limited thereto.

The transparent substrate 110 may include an insulating material having high light transmission, such as glass or polyimide. Each of the conductive patterns 120 may include a conductive material such as a metal, a semiconductor material, and a metal compound.

Two directions parallel to the upper surface of the transparent substrate 110 and substantially perpendicular to each other are defined as first and second directions (X direction and Y direction). In addition, a direction substantially perpendicular to the upper surface of the transparent substrate 110 is defined as a third direction (Z direction). Definitions of the above directions are the same in all the drawings below unless otherwise stated.

Hereinafter, for convenience of description, the transparent substrate 110 will be described based on a substantially rectangular flat plate shape, but this does not limit the technical spirit of the inventive concept in any sense. The transparent substrate 10 included in the mmW reflective structure 100 may have various flat shapes such as a circle, an ellipse, and a polygon, or may include a curved surface. A pair of edges of the transparent substrate 110 may be parallel to the first direction (X direction), and the other pair of edges may be parallel to the second direction (Y direction). The normal of the transparent substrate 110 may be substantially parallel to the third direction (Z direction).

First and second dividing lines L1 and L2 are virtual lines defined on the transparent substrate 110. The first dividing lines L1 are a plurality of virtual lines spaced at equal intervals in the second direction (Y direction) and substantially parallel to the first direction (X direction). The second dividing lines L2 are a plurality of virtual lines spaced at equal intervals in the first direction (X direction) and substantially parallel to the second direction (Y direction). Unit cells U each including the conductive pattern 120 may be defined on the transparent substrate 110 by the first and second dividing lines L1 and L2.

The length of the unit cell U in each of the first and second directions (X and Y directions) may be a unit cell length Lu. According to some embodiments, the unit cell length Lu may be about 3 mm to about 5 mm. However, the inventive concept is not limited thereto, and the distance between the first dividing lines L1 and the distance between the second dividing lines L2 may be different from each other, and accordingly, the length of the unit cell U in the first direction (X direction) may be different from the length of the unit cell U in the second direction (Y direction).

According to some embodiments, the unit cell U may include one conductive pattern 120. According to some embodiments, the conductive pattern 120 may be formed on one side or both sides of the transparent substrate 110.

According to some embodiments, the conductive pattern 120 may have a hollow rectangular shape when viewed in the third direction (Z direction) (i.e., when viewed from above or in a direction perpendicular to the transparent substrate 110), but is not limited thereto. According to some embodiments, a portion of the transparent substrate 110 exposed and surrounded by the conductive pattern 120 may be approximately square, but is not limited thereto. For example, the conductive pattern 120 may have various shapes such as a triangle, a circle, a polygon, a cross, and a straight line when viewed from above.

The center of the conductive pattern 120 may match the center of the unit cell U. According to some embodiments, the transparent substrate 110 surrounded and exposed by the conductive pattern 120 may be approximately square, but is not limited thereto.

According to some embodiments, the lengths of each of the conductive patterns 120 in the first and second directions (X direction and Y direction) may be the same. According to some embodiments, a conductive pattern length Lp may be about 1.5 mm to about 5 mm.

According to some embodiments, the widths of each of the conductive patterns 120 in the first and second directions (X direction and Y direction) may be the same. According to some embodiments, a conductive pattern width Wp may be about 0.1 mm to about 2.0 mm. According to some embodiments, the conductive pattern width Wp may be about 2 μm to about 150 μm. According to some embodiments, the conductive pattern width Wp may be about 4 μm to about 20 μm.

According to some embodiments, the height of the conductive pattern 120 in the third direction (Z direction) may be about 50 Å to about 3000 Å. According to some embodiments, the height of the conductive pattern 120 in the third direction (Z direction) may be about 100 Å to about 2000 Å.

As described below, the conductive patterns 120 arranged in a matrix may be interpreted as LC circuits and may serve as resonators. Accordingly, the mmW reflective structure 100 may reflect electromagnetic waves in a mmW band and transmit electromagnetic waves in a visible light band. According to some embodiments, transmittance of electromagnetic waves of the visible light band in the mmW reflective structure 100 may be about 70% or more. According to some embodiments, the transmittance of electromagnetic waves of the visible light band in the mmW reflective structure 100 may be about 80% or more.

Referring to FIGS. 1C and 1D, the conductive pattern 120 of the unit cell U may exhibit series inductance, and adjacent conductive patterns 120 may operate as a capacitor. Accordingly, the unit cell U may act as an LC resonant circuit equivalently, and a wavelength band of a reflected electromagnetic wave may be selected by adjusting at least one of the unit cell length Lu, the conductive pattern length Lp, and the conductive pattern width Wp.

Figure 2:
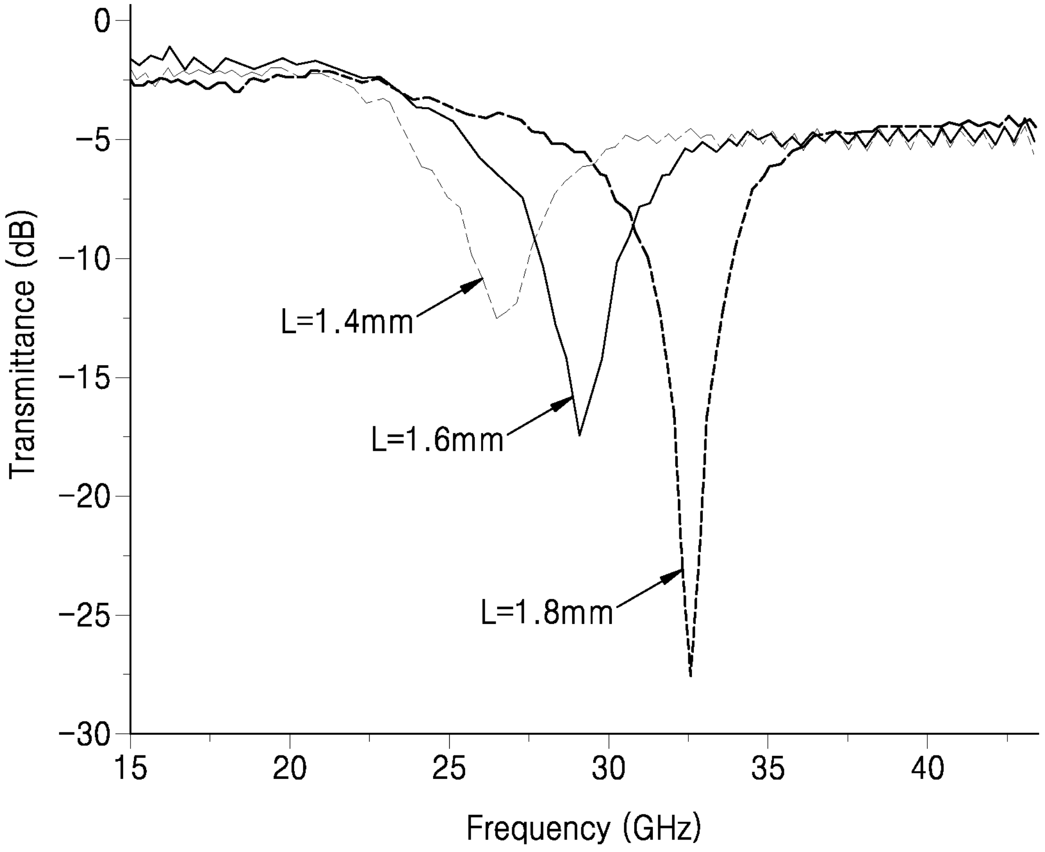
FIG. 2 is a graph for describing mmW reflective structures according to different experimental examples.

FIG. 2 is a graph illustrating a frequency selection characteristic according to a conductive pattern length Lp (see FIG. 1C) of each of the mmW reflective structures according to different experimental examples.

Referring to FIGS. 1B, 1C, and 2, there is illustrated transmittance according to wavelength when a mmW is incident on the opposite side of the conductive pattern 120 with respect to the mmW reflective structure 100 including the conductive pattern 120 having different conductive pattern lengths Lp of 1.4 mm, 1.6 mm, and 1.8 mm. In FIG. 2, the horizontal axis represents frequency in GHz and the vertical axis represents transmittance in dB.

According to the experimental examples, when the conductive pattern length Lp is about 1.4 mm, the center frequency is about 27 GHz, and when the conductive pattern length Lp is about 1.6 mm, the center frequency is about 29 GHz, and when the conductive pattern length Lp is about 1.8 mm, the center frequency is about 32.5 GHz.

It is understood that the center frequency increases as the conductive pattern length Lp increases. In addition, by setting the conductive pattern length Lp to about 1.4 mm to about 1.8 mm, preferably by setting the conductive pattern length LP to about 1.6 mm, a mmW reflective structure 100 having a low transmittance (i.e., high reflectance) with respect to a mmW may be provided.

Figure 3A:
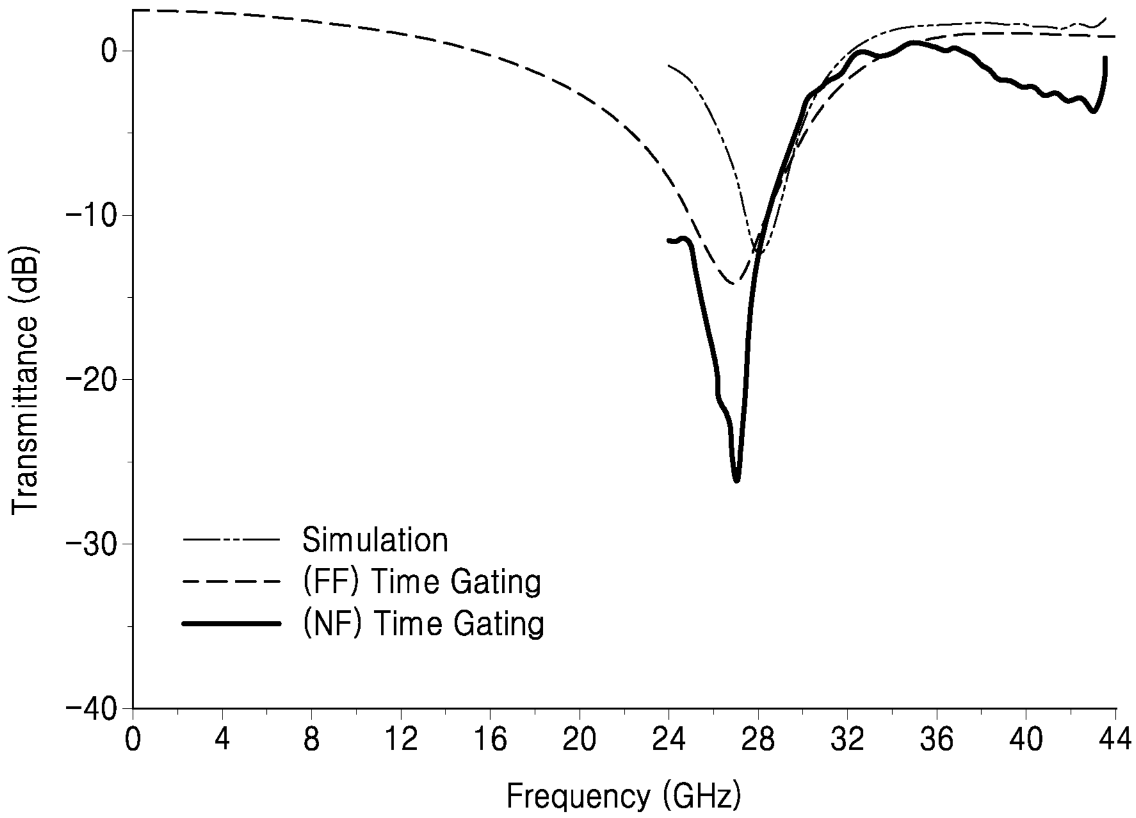
FIGS. 3A to 4B are graphs for describing effects according to experimental examples.
Figure 3B:
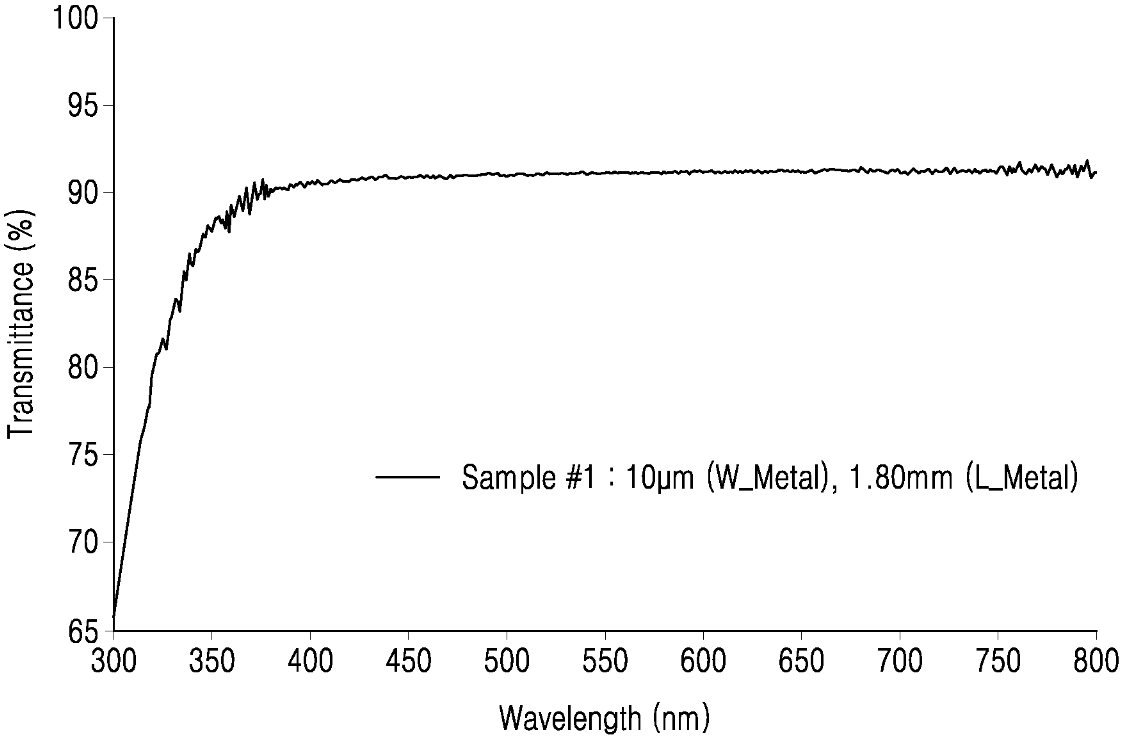

FIGS. 3A and 3B are graphs for describing an effect according to another experimental example. More specifically, FIG. 3A is a graph illustrating transmittance for a frequency band around 28 GHz, and FIG. 3B is a graph illustrating transmittance for a visible light wavelength band.

In the experimental example of FIGS. 3A and 3B, the unit cell length Lu (see FIG. 1C) is about 3 mm, the conductive pattern length Lp (see FIG. 1C) is about 1.80 mm, and the conductive pattern width Wp (see FIG. 1C) is about 10 μm.

In FIG. 3A, the horizontal axis represents frequency in GHz and the vertical axis represents transmittance in dB. FIG. 3A shows transmittance spectra for three cases: far field (FF) measurement, near field (NF) measurement, and simulation. The distance between a reflection station and a transmission station for FF measurement is 920 mm, and the distance between a reflection station and a transmission station for NF measurement is 460 mm. An FF transmittance at 28 GHz is about −12.06 dB, which shows high selectivity for 28 GHz mmW.

In FIG. 3B, the horizontal axis represents wavelength in nm and the vertical axis represents transmittance in %. Referring to FIG. 3B, the transmittance of the experimental example in a visible light area is about 90% or more, which is higher than 85% that is the transparency of general glass.

Figure 4A:
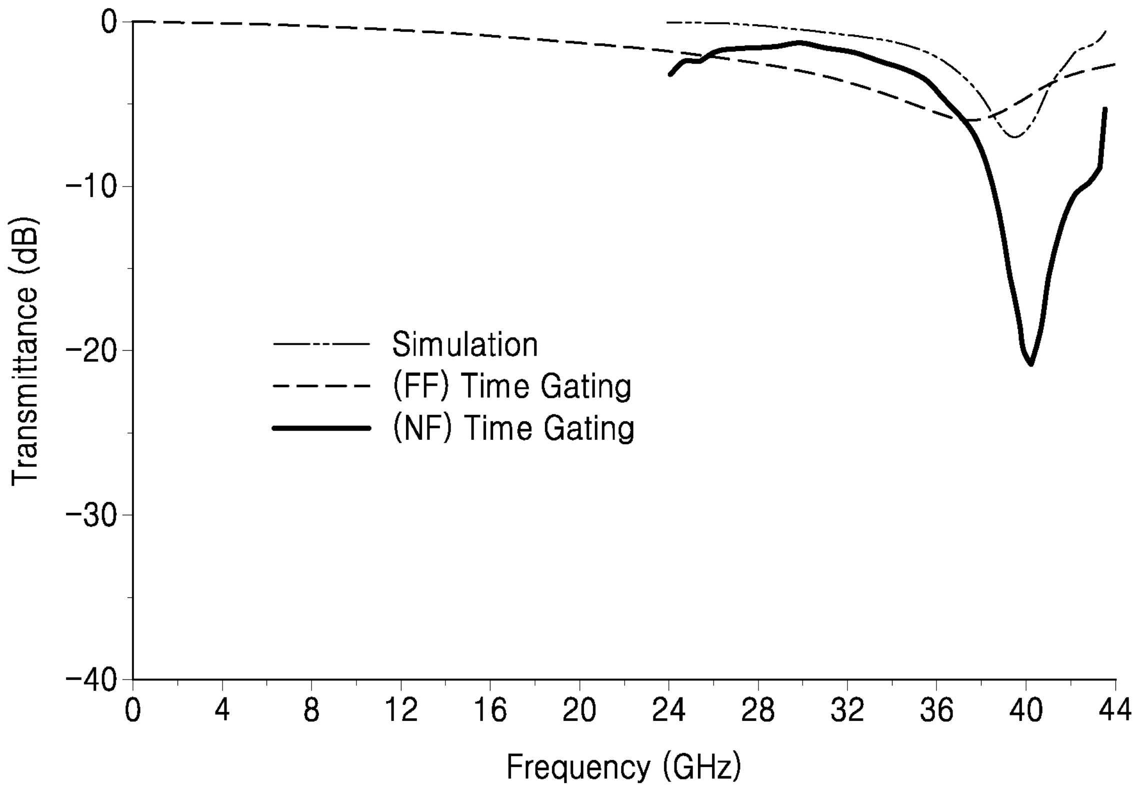
Figure 4B:
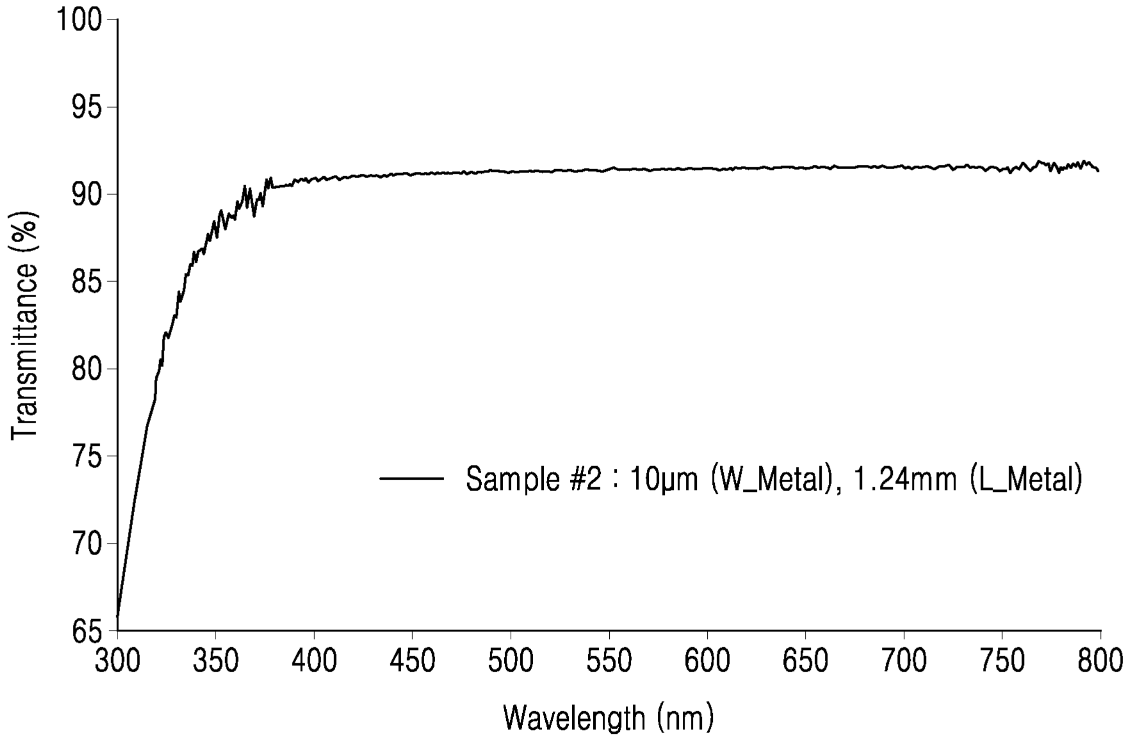

FIGS. 4A and 4B are graphs for describing an effect according to another experimental example. More specifically, FIG. 4A is a graph illustrating transmittance for a frequency band around 39 GHz, and FIG. 4B is a graph illustrating transmittance for a visible light wavelength band.

In the experimental example of FIGS. 4A and 4B, the unit cell length Lu (see FIG. 1C) is about 3 mm, the conductive pattern length Lp (see FIG. 1C) is about 1.24 mm, and the conductive pattern width Wp (see FIG. 1C) is about 10 μm.

In FIG. 4A, the horizontal axis represents frequency in GHz and the vertical axis represents transmittance in dB. FIG. 4A shows transmittance spectra according to FF measurement, NF measurement, and simulation, for an electromagnetic wave with a frequency in the range of about 0 GHz to about 44 GHz. The distance between a reflection station and a transmission station for FF measurement and the distance between a reflection station and a transmission station for NF measurement are the same as those described in FIG. 3A. An FF transmittance at 39 GHz is about −8.52 dB, which shows high selectivity for 28 GHz mmW.

In FIG. 4B, the horizontal axis represents wavelength in nm and the vertical axis represents transmittance in %. Referring to FIG. 4B, the transmittance of the experimental example in a visible light area (e.g., a wavelength band of about 400 nm to about 700 nm) is about 90% or more, which is higher than 85% that is the transparency of general glass.

In the experimental examples of FIGS. 3A to 4B, the conductive pattern width Wp is about 10 μm, which may not be well recognized visually and thus may not damage the aesthetics of products even when FSS is used in a glass window of a building or a display.

Figure 5A:
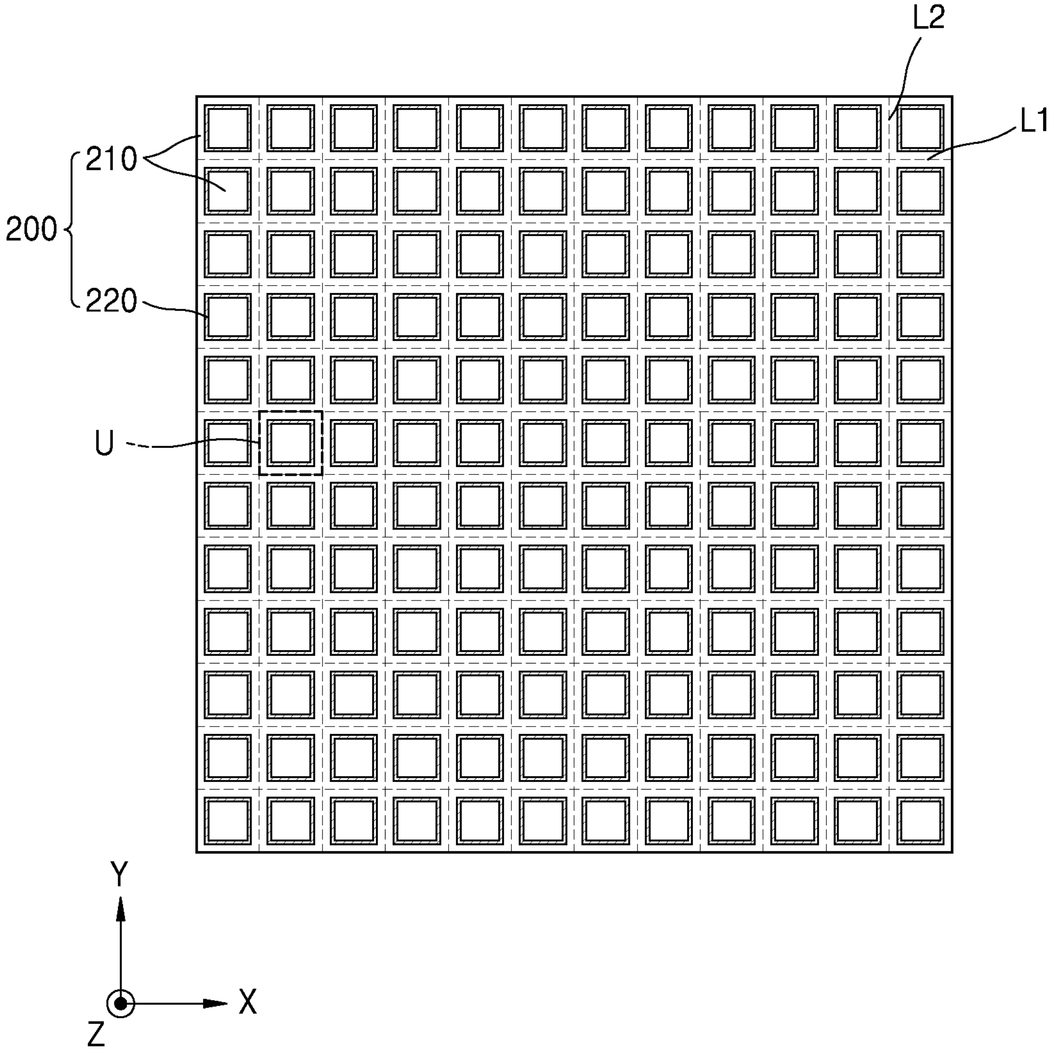
FIG. 5A is a plan view of a mmW reflective structure according to some embodiments.
Figure 5B:
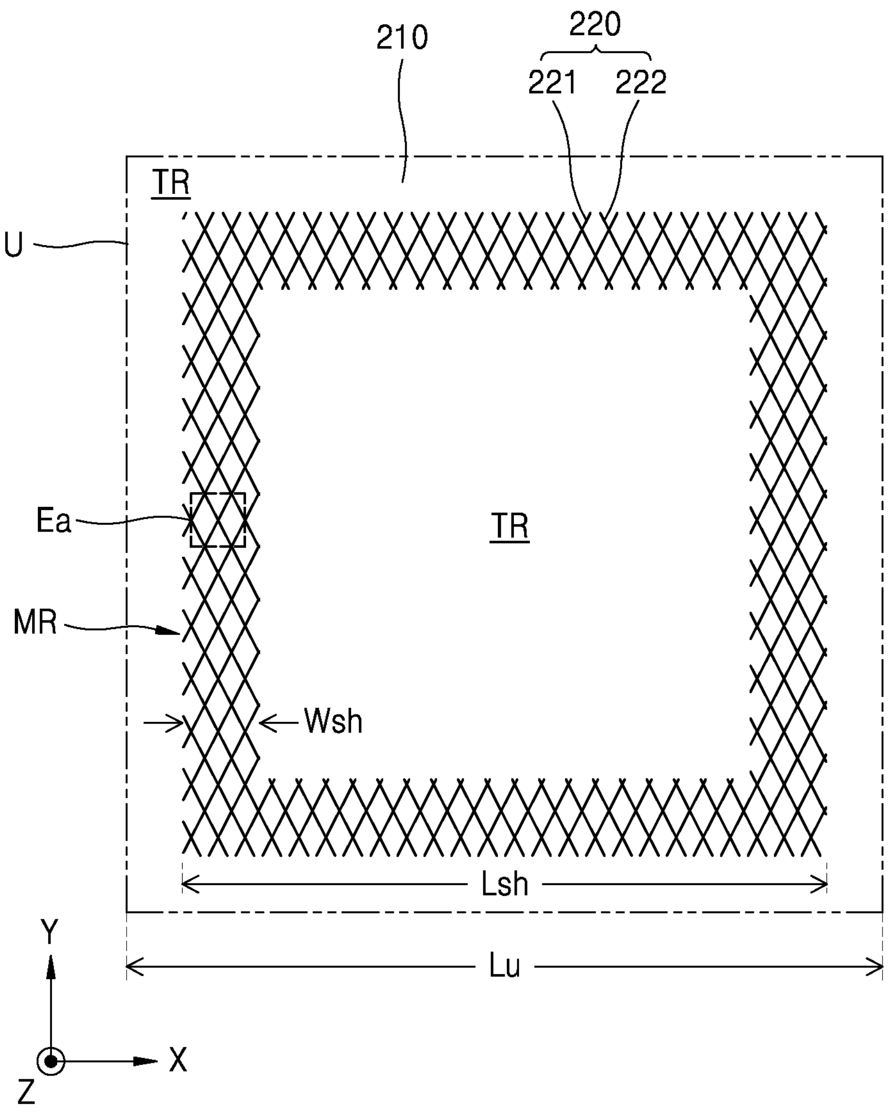
FIG. 5B is an enlarged partial plan view of a unit cell of FIG. 5A.

FIG. 5A is a plan view of a mmW reflective structure 200 according to some embodiments. FIG. 5B is an enlarged partial plan view of a unit cell U of FIG. 5A, and FIG. 5C is an enlarged partial plan view of a portion Ea of FIG. 5B.

Referring to FIG. 5A, the mmW reflective structure 200 may include a transparent substrate 210 and conductive patterns 220 formed on the transparent substrate 210.

The transparent substrate 210 is substantially the same as the transparent substrate 110 described with reference to FIGS. 1A and 1B, and the definition of directions and the definition of the unit cell U are also the same as those described with reference to FIGS. 1A and 1B, and thus repeated descriptions thereof will be omitted.

Figure 5C:
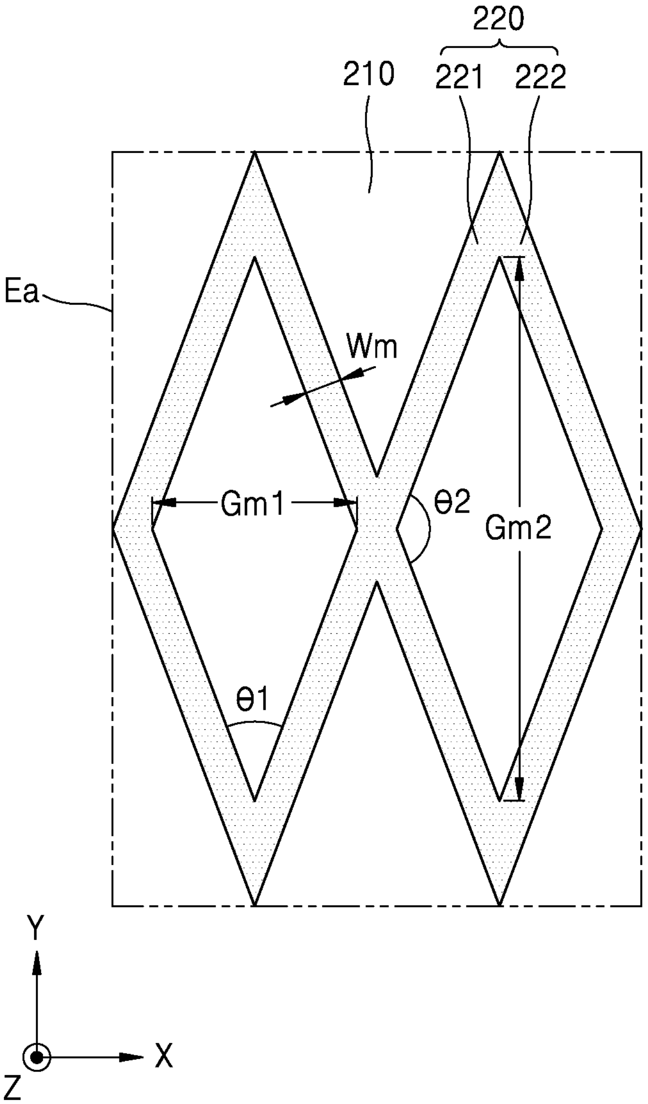
FIG. 5C is an enlarged partial plan view of a portion of FIG. 5B.

Referring to FIGS. 5B and 5C, the conductive patterns 220 may be formed in a mesh structure. A portion in which the mesh structure is formed in the unit cell U is defined as a mesh region MR, and a portion in which the mesh structure is not formed is defined as a transparent region TR.

According to some embodiments, the mesh region MR may have a hollow rectangular shape when viewed in the third direction (Z direction) (i.e., when viewed from above or in a normal direction of the transparent substrate 210), but is not limited thereto. According to some embodiments, the lengths of each of the mesh regions MR in the first and second directions (X direction and Y direction) may be the same. According to some embodiments, a mesh region length Lsh may be about 1.5 mm to about 5 mm.

According to some embodiments, the widths of each of the mesh regions MR in the first and second directions (X direction and Y direction) may be the same. According to some embodiments, a mesh region width Wsh may be about 0.1 mm to about 2.0 mm.

According to some embodiments, the mesh structure of the conductive patterns 220 may be formed by a plurality of first and second conductive lines 221 and 222 extending in an oblique direction with respect to each of the first and second directions (X direction and Y direction). The transparent substrate 210 surrounded and exposed by the first and second conductive lines 221 and 222 may have a diamond shape.

The first and second conductive lines 221 and 222 may form a first angle 81 or a second angle 82 with each other. The first angle 81 may be greater than the second angle 82. The first angle 81 may be an acute angle and the second angle 82 may be an obtuse angle. The sum of the first and second angles 81 and 82 may be about 180°.

A first gap Gm1 of a diamond shape corresponding to the exposed transparent substrate 210 may be less than a second gap Gm2 of the diamond shape. In some embodiments, the first gap Gm1 may be about 200 μm to about 400 μm. According to some embodiments, the second gap Gm2 may be about 300 μm to about 1200 μm. According to some embodiments, the second gap Gm2 may be about 1.5 times to about 3 times the first gap Gm1. According to some embodiments, the first gap Gm1 may be about 200 μm and the second gap Gm2 may be about 400 μm, but they are not limited thereto. According to some embodiments, the length of the diamond shape in the first direction (X direction) may be about 200 μm, and the length of the diamond shape in the second direction (Y direction) may be about 400 μm.

According to some embodiments, the width Wm of each of the first and second conductive lines 221 and 222 may be about 1 μm to about 10 μm, but is not limited thereto. According to some embodiments, the width Wm of each of the first and second conductive lines 221 and 222 may be any one of about 3 μm, about 5 μm, about 7 μm, and about 10 μm, but is not limited thereto. Here, the first and second gaps Gm1 and Gm2 are respectively defined as lengths parallel to the first and second directions (X direction and Y direction) between opposing corners of the transparent substrate 210 surrounded and exposed by the first and second conductive lines 221 and 222, as shown in FIG. 5C.

In addition, the transparency (i.e., visible light transmittance) of the conductive patterns 220 formed by the first and second conductive lines 221 and 222 may be higher as the first and second gaps Gm1 and Gm2 become larger than the width Wm of each of the first and second conductive lines 221 and 222. As described above, when the first gap Gm1 is about 200 μm, the second gap Gm2 is about 400 μm, and the width Wm of each of the first and second conductive lines 221 and 222 is about 3 μm, the visible light transmittance may be about 90%.

In addition, as the width Wm of each of the first and second conductive lines 221 and 222 is smaller, it is difficult to visually recognize the first and second conductive lines 221 and 222, and thus, the first and second conductive lines 221 and 222 are not easily recognized even when FSS is installed in a display or a glass window of an exterior wall of a building, and thus, an aesthetic effect is excellent.

Table 1 below shows the characteristics of the mmW reflective structure 200 according to the width Wm of each of the first and second conductive lines 221 and 222. In Table 1, "thickness" refers to the thickness of each of the first and second conductive lines 221 and 222 in the third direction (Z direction).

TABLE 1

| | Width (Wm) (μm) | Thickness (μm) | Conductance per length [S/m] | Surface impedance [ohm/sq] |
|---|---|---|---|---|
| Experimental example 1 | 3 | 0.2 | $1.55 \cdot 10^6$ | 3.22 |
| Experimental example 2 | 5 | 0.2 | $2.675 \cdot 10^6$ | 1.87 |
| Experimental example 3 | 7 | 0.2 | $3.675 \cdot 10^6$ | 1.36 |
| Experimental example 4 | 10 | 0.2 | $4.85 \cdot 10^6$ | 1.03 |
| Experimental example 5 | 3 | 2.0 | $1.6 \cdot 10^6$ | 0.31 |
| Experimental example 6 | 5 | 2.0 | $2.675 \cdot 10^6$ | 0.19 |
| Experimental example 7 | 7 | 2.0 | $3.6 \cdot 10^6$ | 0.14 |
| Experimental example 8 | 10 | 2.0 | $4.85 \cdot 10^6$ | 0.1 |

As shown in the experimental examples, the thickness of the conductive pattern may be about 0.2 μm to about 2.0 μm. As shown in the experimental examples, the conductive pattern width Wm may be about 3 μm to about 10 μm.

The surface impedance of the mmW reflective structure 200 may be determined in proportion to the strength of an electric field and in inverse proportion to the strength of a magnetic field. Accordingly, when the width Wm of each of the first and second conductive lines 221 and 222 decreases, as the distance between resonators decreases, the strength of the electric field of a surface wave increases and the strength of the magnetic field decreases. Thus, the magnitude of the surface impedance of the mmW reflective structure 200 may increase. When surface impedance increases, surface current decreases and thus a surface wave is suppressed. On the other hand, when the width Wm of each of the first and second conductive lines 221 and 222 increases, the strength of the magnetic field may increase as the strength of the electric field decreases, and the magnitude of the surface impedance may decrease. However, this description is for the purpose of understanding and the technical spirit of the inventive concept is not limited to the above-described natural scientific description.

In some embodiments, a surface wave removal rate may be adjusted by adjusting the width Wm of each of the first and second conductive lines 221 and 222.

Figure 5D:
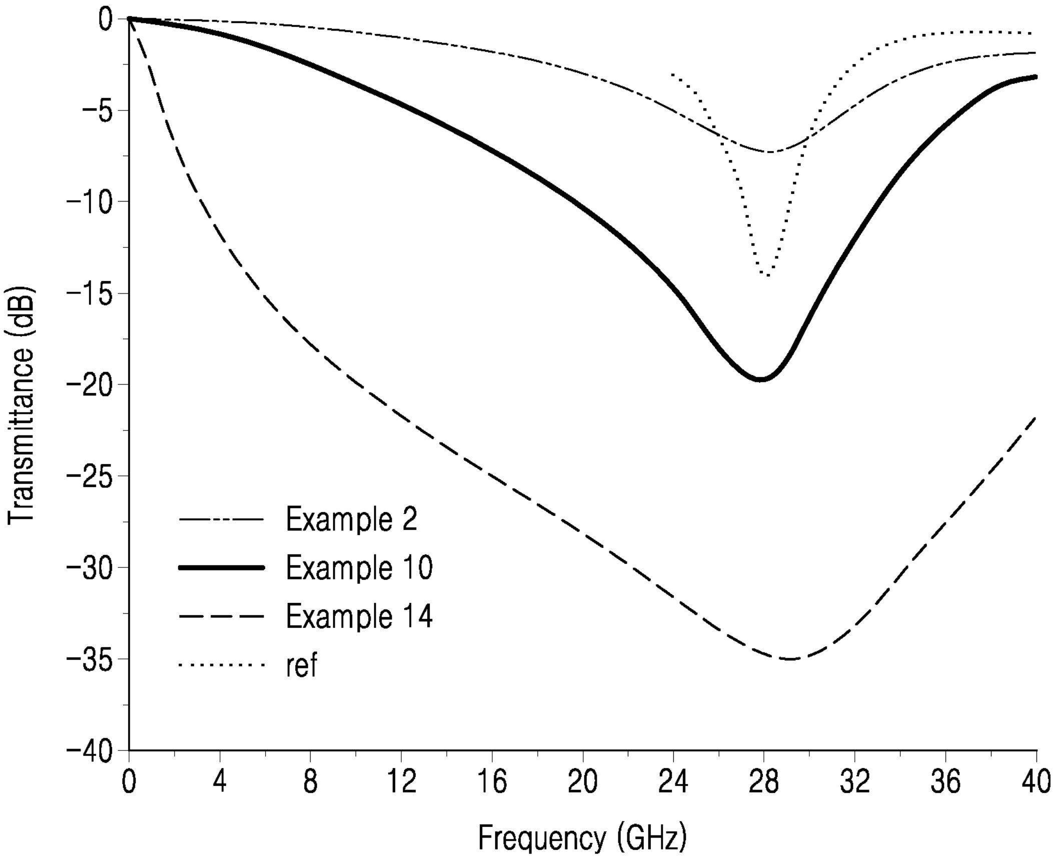
FIG. 5D is a graph for describing a mmW reflective structure according to some experimental examples.

FIG. 5D is a graph illustrating the transmittance of an electromagnetic wave having a frequency of 28 GHz in mmW reflective structures according to different experimental examples. More specifically, the graph shows transmittance according to the frequency of 28 GHz in mmW reflective structures corresponding to Experimental example 2, Experimental example 10, and Experimental example 14 in Table 2, respectively. FIG. 5D further shows, as a reference (ref), the transmittance of the mmW reflective structure 100 (see FIG. 1) including a conductive pattern 120 (see FIG. 1C) of a solid type, in which the unit cell length Lu (see FIG. 1C) is about 3 mm, the conductive pattern length Lp (see FIG. 1C) is about 1.80 mm, and the conductive pattern width Wp (see FIG. 1C) is about 10 μm.

In FIG. 5D, the horizontal axis represents frequency in GHz, the vertical axis represents transmittance in dB, and the transmission is a numerical value measured at an FF transmission station of 920 mm.

Table 2 shows transmittances according to different conductive pattern lengths and conductive pattern widths.

TABLE 2

| | Mesh region width (Wsh) (mm) | Mesh region length (Lsh) (mm) | Transmittance [dB] |
|---|---|---|---|
| Experimental example 1 | 0.1 | 1.95 | −4.99 |
| Experimental example 2 | 0.2 | 2.15 | −8.18 |
| Experimental example 3 | 0.3 | 2.35 | −9.09 |
| Experimental example 4 | 0.4 | 2.6 | −11.03 |
| Experimental example 5 | 0.5 | 2.8 | −12.03 |
| Experimental example 6 | 0.6 | 3 | −13.91 |
| Experimental example 7 | 0.7 | 3.2 | −15.45 |
| Experimental example 8 | 0.8 | 3.45 | −16.91 |
| Experimental example 9 | 0.9 | 3.65 | −18.19 |
| Experimental example 10 | 1.0 | 3.85 | −19.66 |
| Experimental example 11 | 1.2 | 4.25 | −22.31 |
| Experimental example 12 | 1.4 | 4.55 | −24.95 |
| Experimental example 13 | 1.6 | 4.82 | −29.22 |
| Experimental example 14 | 1.8 | 4.95 | −34.76 |
| Experimental example 15 | 2.0 | 4.99 | — |

Referring to FIG. 5D and Table 2, in Experimental example 10, the transmittance is about −20 dB and the intensity of a transmittance mmW transmitted through a mmW reflective structure is about 1⁄10 of the intensity of an incident mmW, and thus, it may be seen that most of the mmW is reflected.

In addition, referring to FIG. 5D, in Experimental example 2, the transmittance for 28 GHz is relatively high, and in Experimental example 14, the transmittance for other frequencies outside a frequency band around 28 GHz is low and thus the selectivity is insufficient, and an area occupied by a metal pattern is too large and thus may be easily recognized visually. On the other hand, in Experimental example 10, excellent frequency selective reflection characteristics are obtained for a mmW of 28 GHz.

For example, as shown in FIG. 1C, when the conductive pattern 120 (see FIG. 2) is of not a mesh type but a solid type (i.e., a type that completely fills an area in which the conductive pattern is arranged), the conductive pattern 120 may be easily recognized visually when the width of the conductive pattern 120 is about 0.1 mm or more, and thus, the aesthetics of products may be damaged.

According to some embodiments, by providing the conductive pattern 220 in the form of a mesh, even when the mesh region width Wsh is 0.1 mm or more, for example, about 0.1 mm to about 2.0 mm, the conductive pattern 220 may not be visually recognized. Accordingly, even in the case where the mesh region width Wsh is 1 mm as in Experimental example 10, the mmW reflective structure 200 that is not well recognized visually and has a high transmittance for a visible light area may be provided.

Figure 6A:
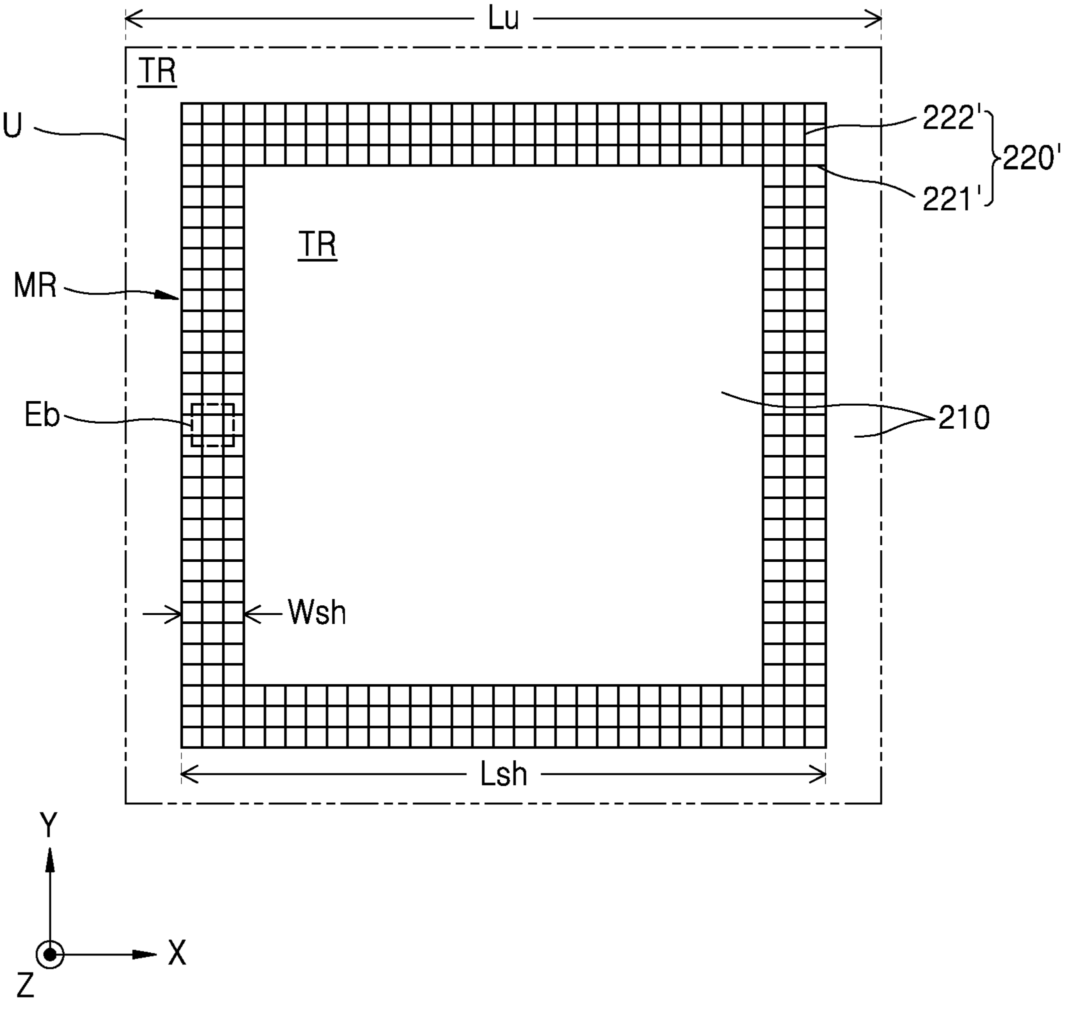
FIGS. 6A and 6B are partial plan views illustrating another example of a conductive pattern in FIG. 5A.
Figure 6B:
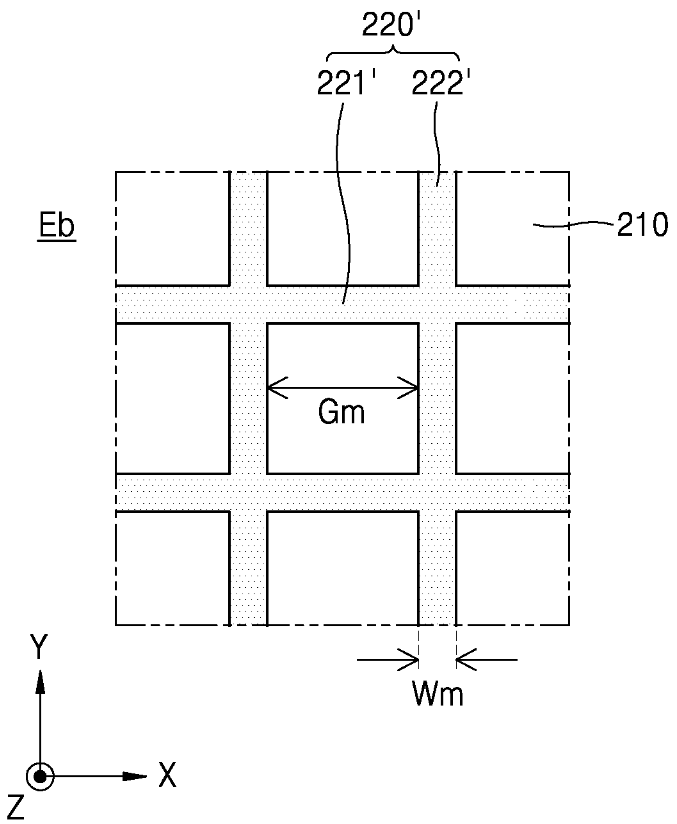

FIGS. 6A and 6B are partial plan views illustrating a conductive pattern 220' that is another example of the conductive pattern 220 in FIG. 5A. More specifically, FIG. 6A is a partial plan view corresponding to FIG. 5B and shows a unit cell U according to some other embodiments, and FIG. 6B shows an enlarged view of a portion Eb of FIG. 6A.

For convenience of description, descriptions that are the same as those provided with reference to FIGS. 5B and 5C will be omitted and differences will mainly be described.

Referring to FIGS. 6A and 6B, the conductive pattern 220' may include first conductive lines 221' substantially parallel to the first direction (X direction) and second conductive lines 222' substantially parallel to the second direction (Y direction).

According to some embodiments, the gap between adjacent first conductive lines 221' and the gap between adjacent second conductive lines 222' may be equal to each other as a gap Gm. In some embodiments, a width Wm of each of first and second conductive lines 221' and 222' may be about 1 μm to about 10 μm. According to some embodiments, when the gap Gm is about 40 times the width Wm, for example, when the gap Gm is 5 μm and the width Wm is 200 μm, the transparency of a visible light band of the mmW reflective structure 200 (see FIG. 5A) including the unit cell U may be about 90%.

Figure 7A:
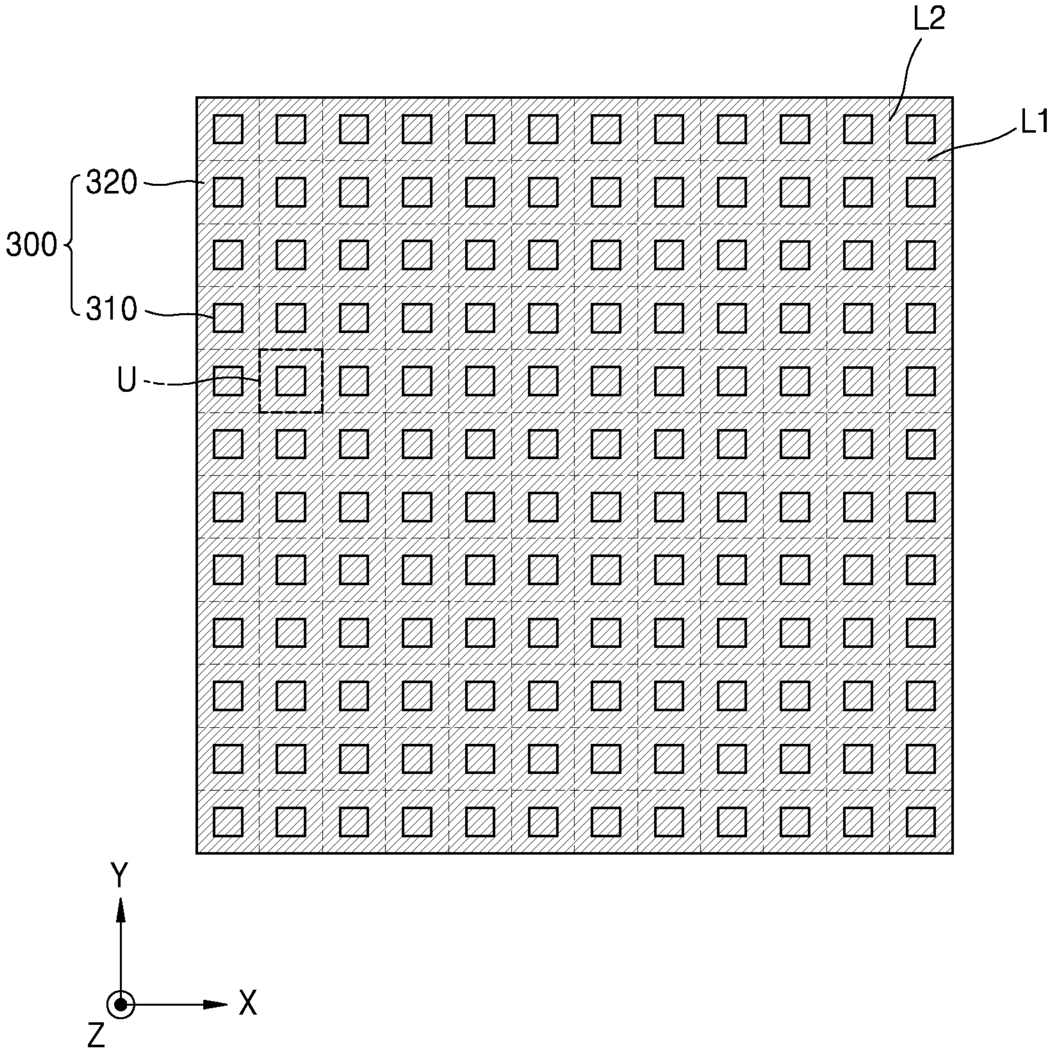
FIG. 7A is a plan view of a mmW transmission structure according to some embodiments.
Figure 7B:
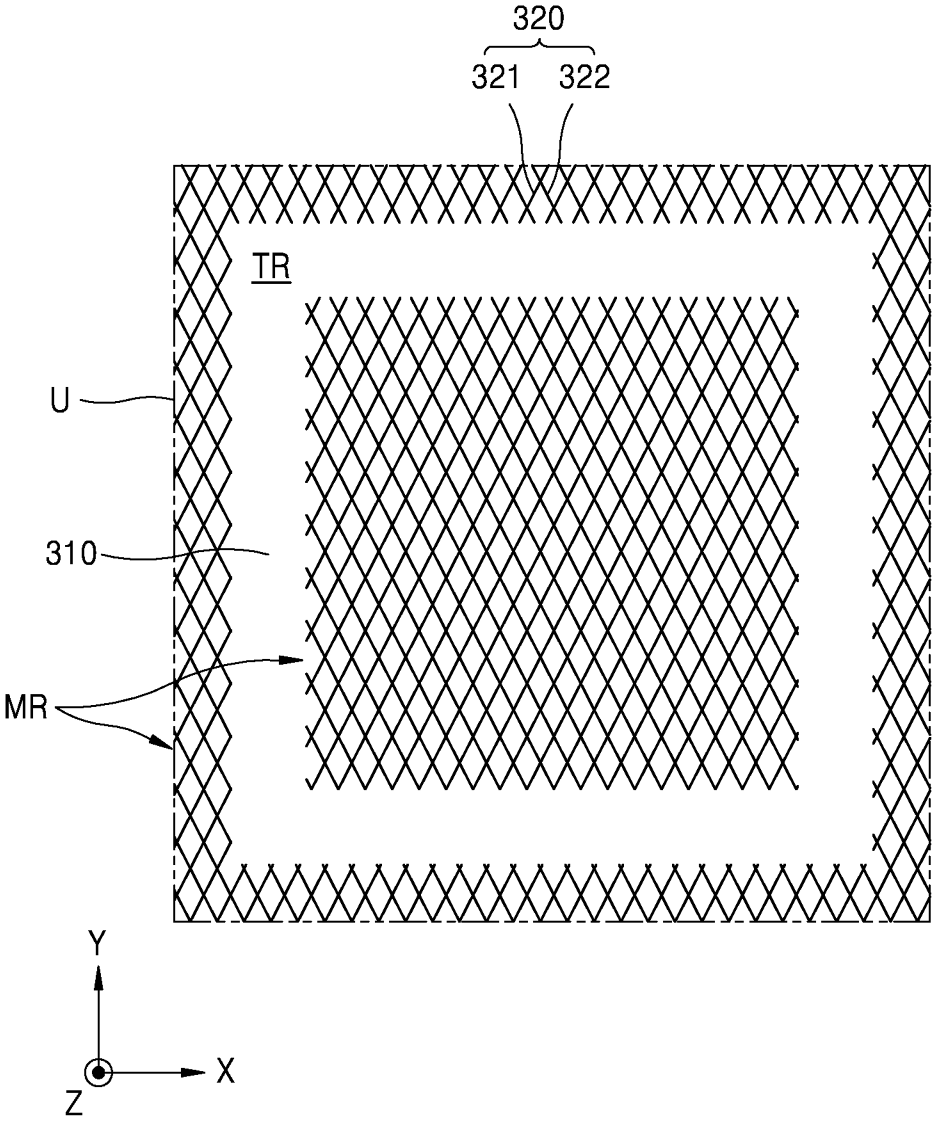
FIG. 7B is an enlarged partial plan view of a unit cell of FIG. 7A.

FIG. 7A is a plan view of a mmW transmission structure 300 according to some embodiments. FIG. 7B is an enlarged partial plan view of a unit cell U of FIG. 7A.

Referring to FIGS. 7A and 7B, the mmW transmission structure 300 may include a transparent substrate 310 and conductive patterns 320.

The transparent substrate 310 is substantially the same as the transparent substrate 110 described with reference to FIGS. 1A and 1B, and the definition of directions and the definition of the unit cell U are also the same as those described with reference to FIGS. 1A and 1B, and thus repeated descriptions thereof will be omitted.

The conductive patterns 320 formed in the unit cell U may have a structure that is different from that of the conductive patterns 220 formed in the unit cell U of FIG. 5B. More specifically, the unit cell U of FIG. 7A may have a structure in which the mesh region MR and the transparent region TR of the unit cell U of FIG. 5A are inverted from each other. Accordingly, the area ratio of the mesh region MR to the unit cell U may be 50% or more, but is not limited thereto. Accordingly, the mmW transmission structure 300 may directionally transmit an incident mmW. First and second conductive lines 321 and 322 included in each of the conductive patterns 320 may have a structure similar to that of FIG. 5B.

Although many portions of the mmW transmission structure 300 of FIG. 7A are shown as being covered by a conductive material, this is somewhat exaggerated, and actually, the thicknesses of the conductive lines 321 and 322 are sufficiently small so that the degree of visual recognition may be low. In addition, transmittance of visible light may also be maintained to a high degree. Accordingly, even when the mmW transmission structure 300 is used as a glass window of a building, a mmW may be transmitted also in NLoS without deteriorating a building appearance, lighting, and view.

Figure 8:
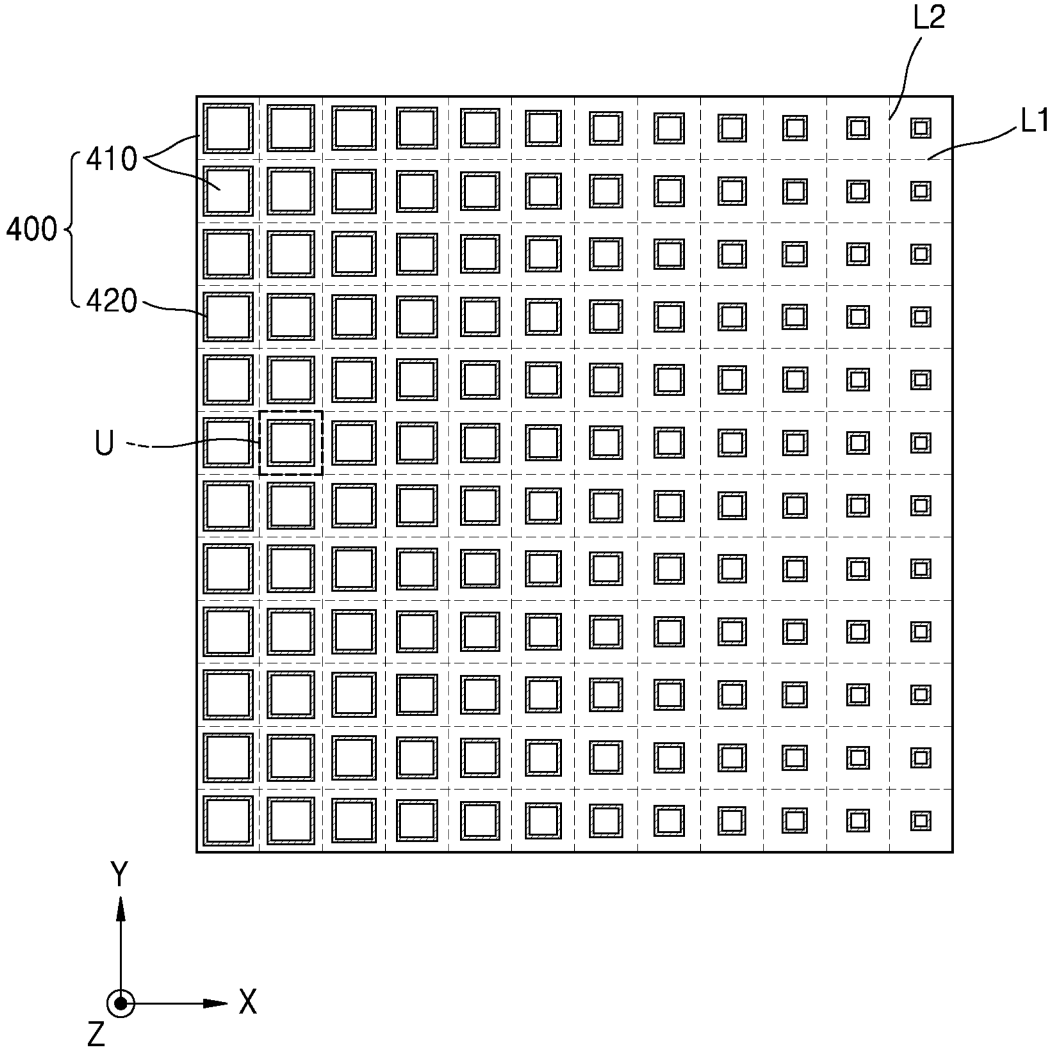
FIG. 8 is a plan view of a mmW reflective structure according to some other embodiments.

FIG. 8 is a plan view of a mmW reflective structure 400 according to some other embodiments.

Referring to FIG. 8, the mmW reflective structure 400 may include a transparent substrate 410, and conductive patterns 420 arranged in a matrix on the transparent substrate 410.

The transparent substrate 410 is substantially the same as the transparent substrate 110 described with reference to FIGS. 1A and 1B, and the definition of directions and the definition of a unit cell U are also the same as those described with reference to FIGS. 1A and 1B, and thus repeated descriptions thereof will be omitted.

One conductive pattern 420 may be arranged in each of unit cells U. The center of the conductive pattern 420 may match the center of the unit cells U. According to some embodiments, the size of the conductive pattern 420 may vary. According to some embodiments, the size of the conductive pattern 420 may vary in the first direction (X direction). According to some embodiments, the size of the conductive pattern 420 may become smaller from one end toward the other end in the first direction (X direction).

According to some embodiments, the size of the conductive pattern 420 may become smaller at a constant rate, but is not limited thereto. According to some embodiments, a change in the size of the conductive pattern 420 may be used to direct a mmW reflected by the mmW reflective structure 400. Hereinafter, the mmW directing characteristics of the mmW reflective structure 400 will be described in more detail with reference to FIGS. 9A to 9C.

Figure 9A:
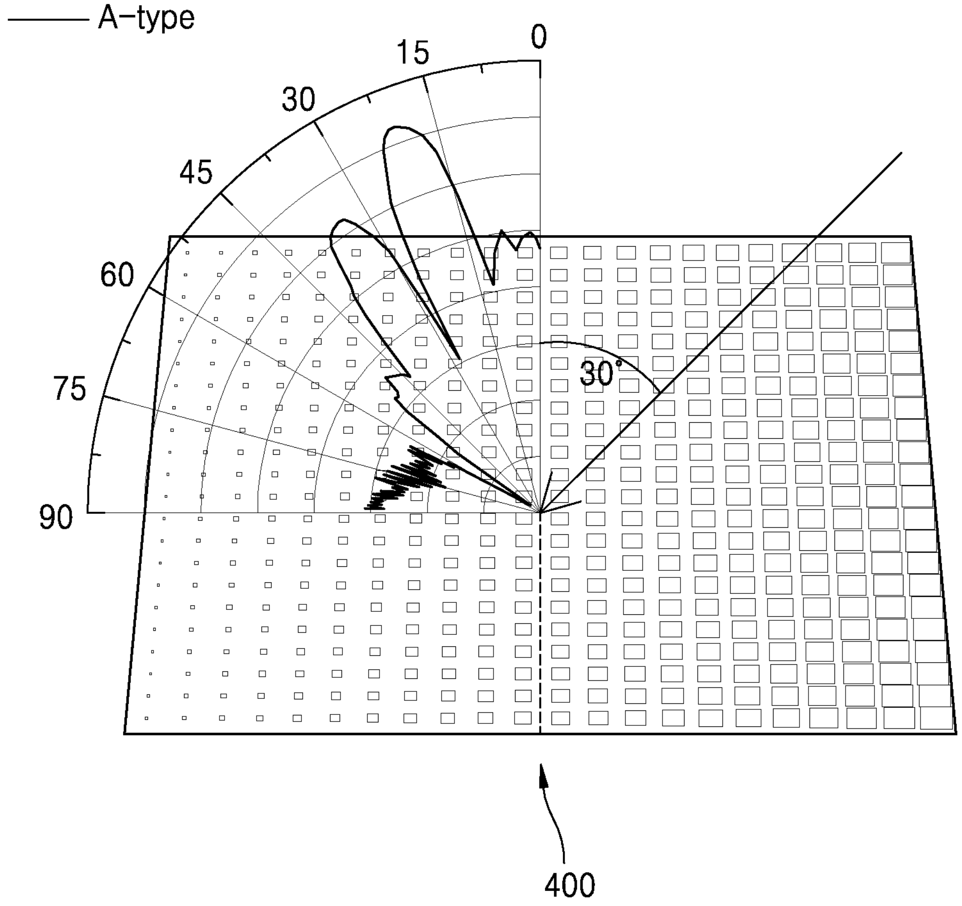
FIGS. 9A to 9C are schematic views for describing effects according to experimental examples.

According to some embodiments, a unit cell U of FIG. 9A may include any one of the conductive pattern 120 of FIG. 1C, which is of a solid type, the conductive pattern 220 of FIG. 5B, which is a mesh type, and the conductive pattern 220' of FIG. 6A, which is a mesh type.

Figure 9B:
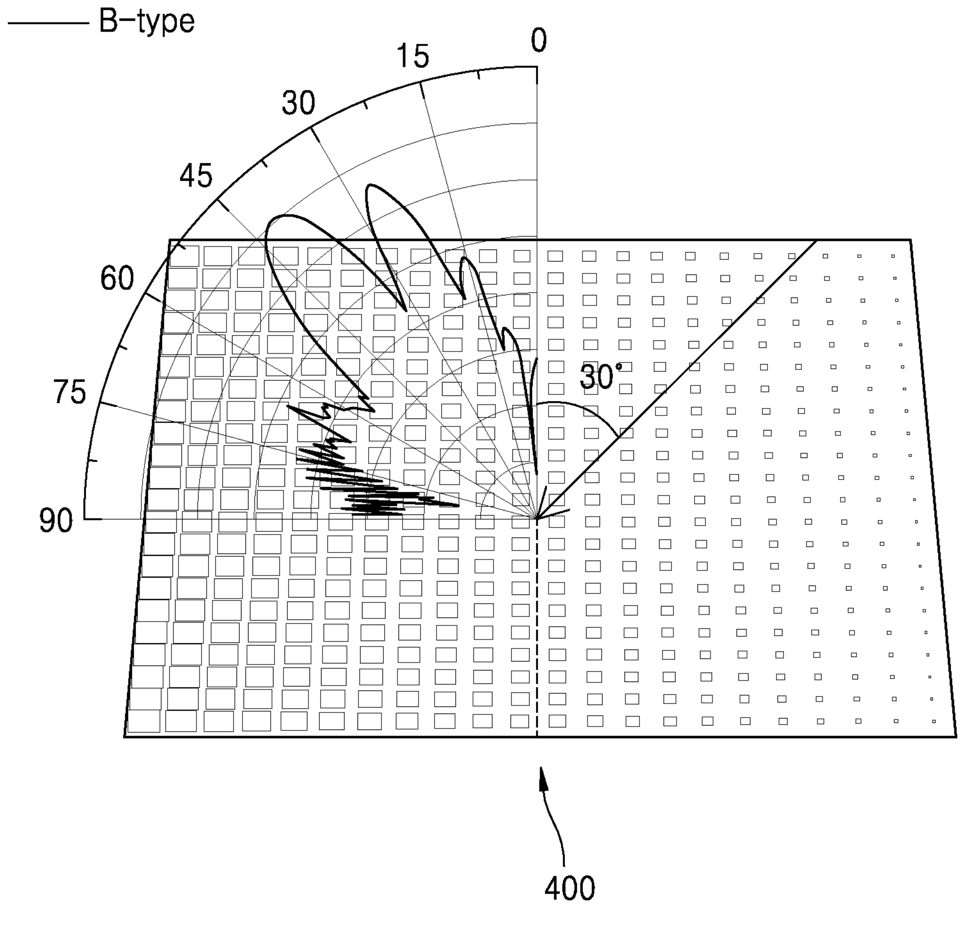
Figure 9C:
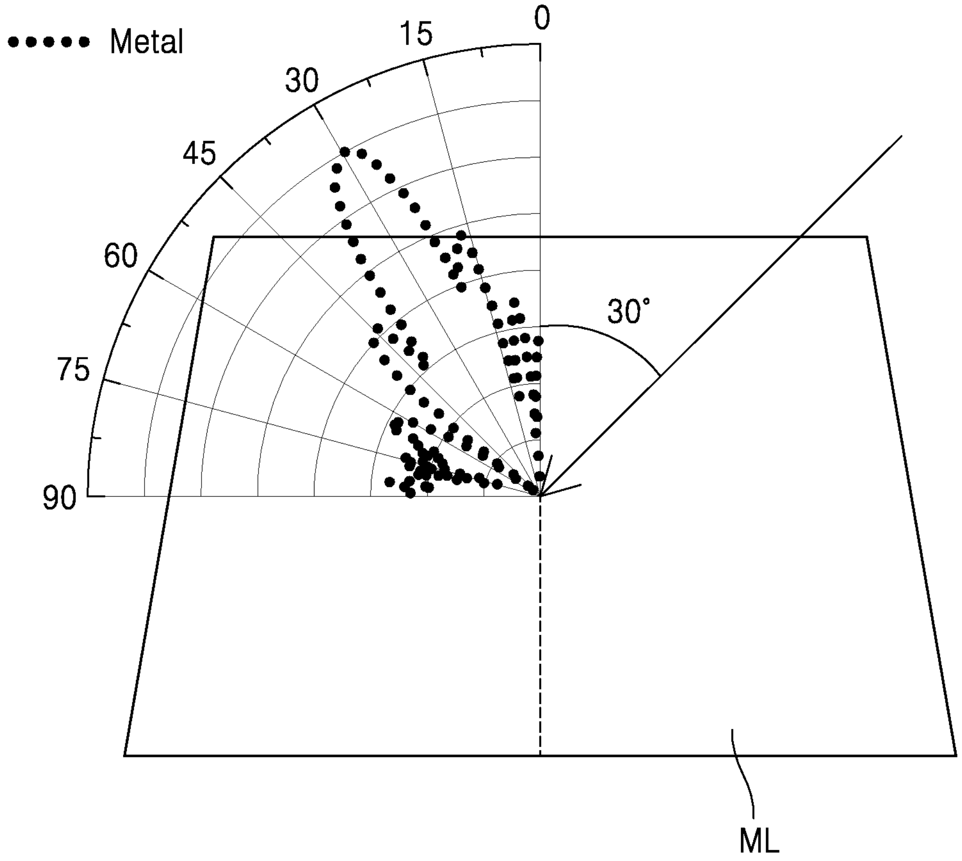

FIGS. 9A to 9C are schematic views for describing effects according to experimental examples and a comparative example.

In the example of FIGS. 9A and 9B, the transparent substrate 410 included in the mmW reflective structure 400 is a glass substrate, and the length of each of the edges thereof is about 66 mm. The lengths of each of the unit cells U in the first and second directions (X and Y directions) are 3.0 mm, and the unit cells U forms a matrix of 22 rows and 22 columns. A conductive pattern length increases (or decreases) by 0.1 mm from about 0.6 mm to about 2.7 mm.

Referring to FIGS. 8, 9A, and 9B, a mmW of about 28 GHz with an angle of about 30° relative to the normal of the mmW reflective structure 400 is incident. In FIG. 9A, a mmW is incident in a direction in which the size of the conductive pattern 420 decreases, whereas in FIG. 9B, a mmW is incident in a direction in which the size of the conductive pattern 420 increases.

In the experimental example of FIG. 9A, a mmW is directed at a reflection angle of about 20° from an incident angle of about 30°, and in the experimental example of FIG. 9B, a mmW is directed at a reflection angle of about 42° from an incident angle of about 30°.

FIG. 9C shows, as a comparative example, the mmW directing characteristics of a metal plate ML including copper. Referring to FIG. 9C, it can be seen that the incident angle and the reflection angle of a mmW incident on the metal plate ML are substantially equal to each other as about 30°.

As such, by changing the size of the conductive pattern 420 of the mmW reflective structure 400 in various ways, desired light directing characteristics may be obtained.

Figure 10A:
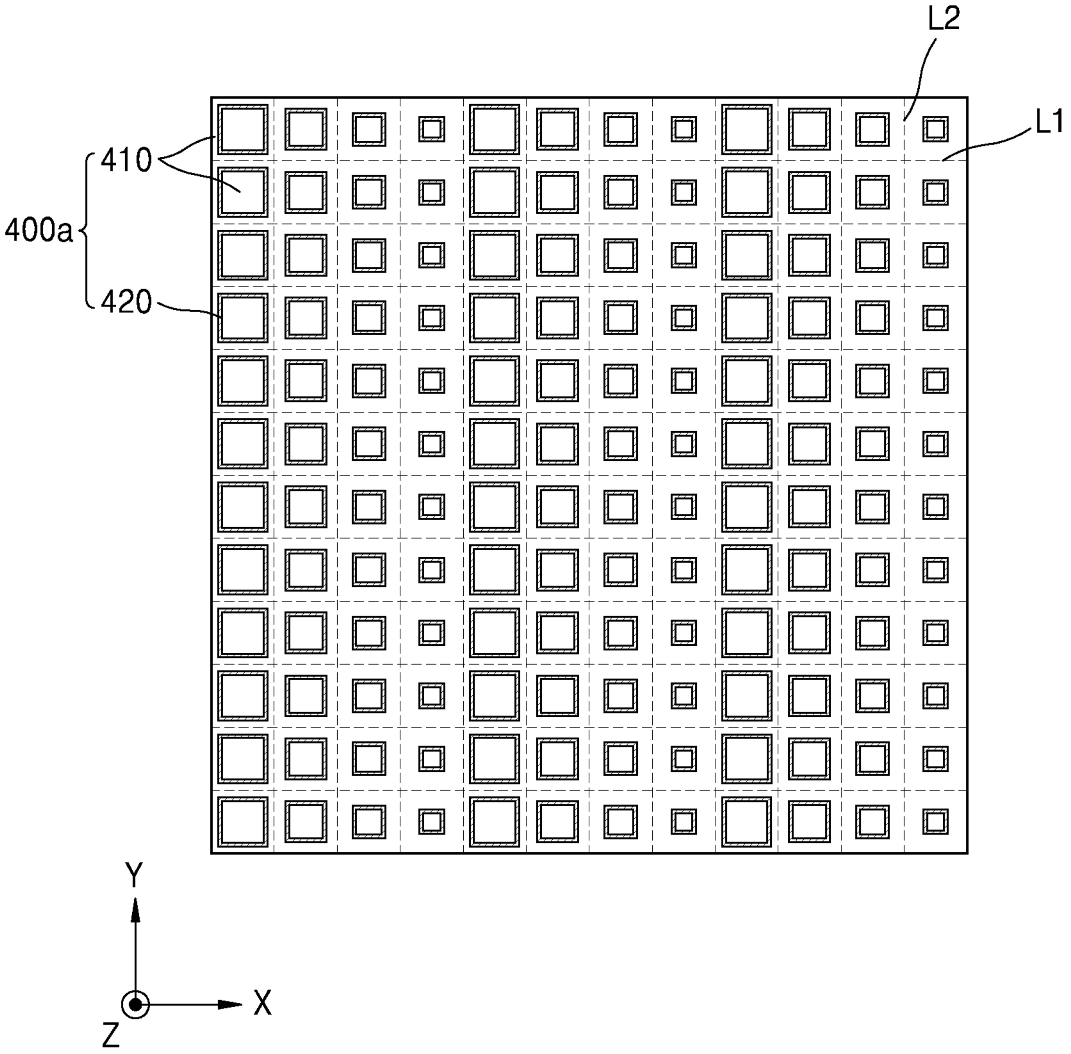
FIGS. 10A to 10C are plan views of mmW reflective structures according to some other embodiments.
Figure 10B:
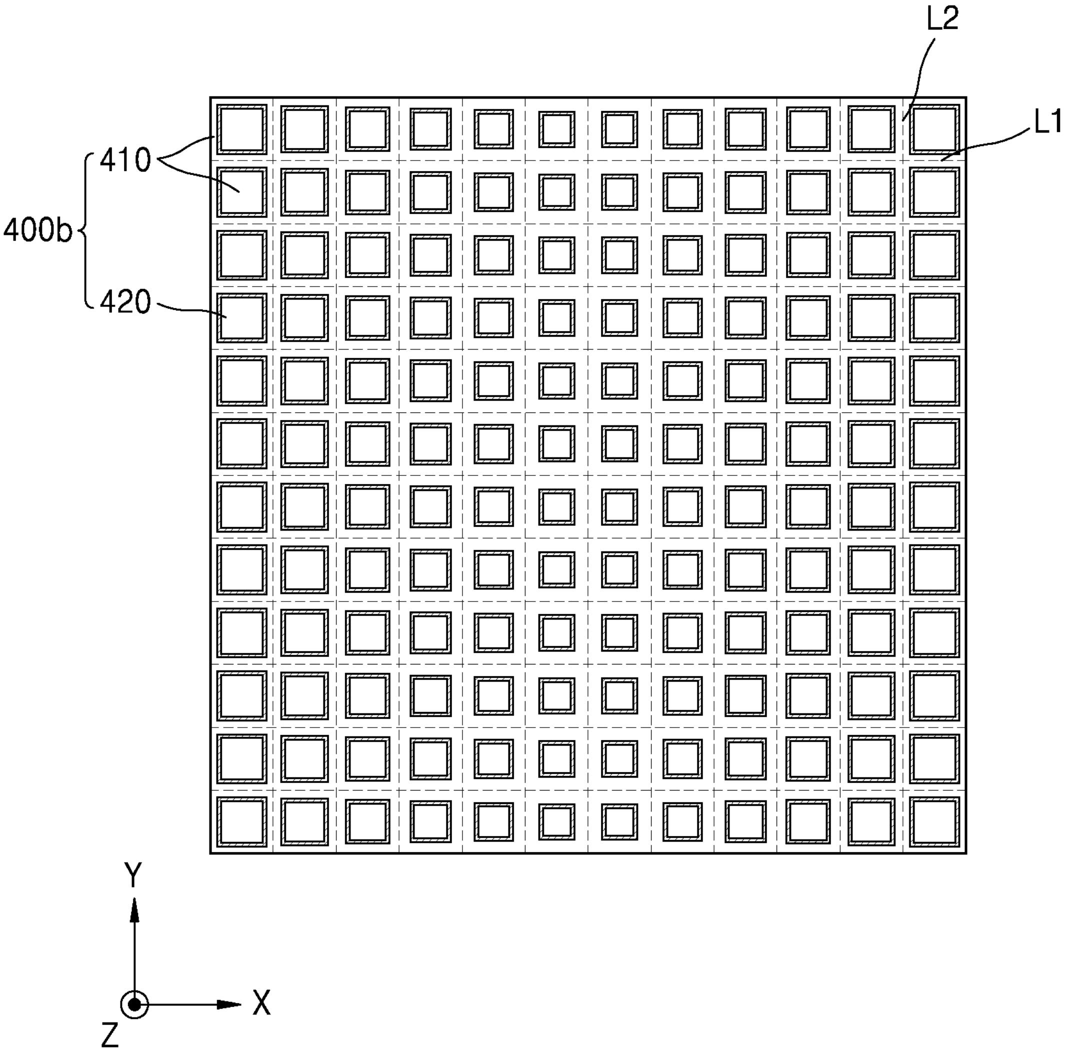
Figure 10C:
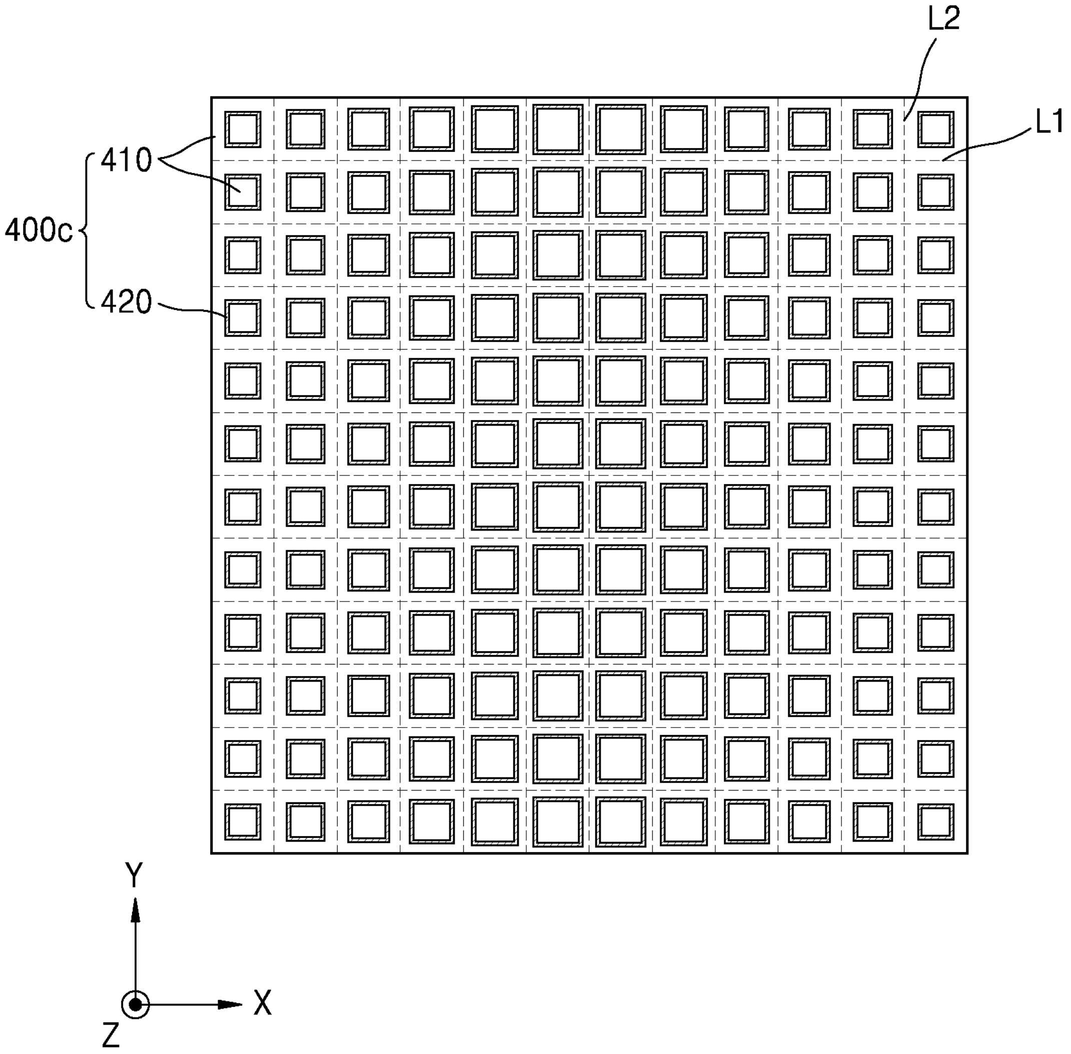

FIGS. 10A to 10C are plan views of mmW reflective structures 400*a*, 400*b*, and 400*c* according to some other embodiments.

With respect to FIGS. 10A to 10C, for convenience of description, descriptions that are the same as those provided with reference to FIG. 8 will be omitted and differences will mainly be described.

Referring to FIG. 10A, the mmW reflective structure 400*a* may include a structure in which size reduction of conductive patterns 420 is repeated in the first direction (X direction).

Referring to FIG. 10B, the sizes of conductive patterns 420 included in the mmW reflective structure 400*b* may decrease in the first direction (X direction) and then increase. Accordingly, the sizes of conductive patterns 420 in a center portion of a transparent substrate 410, in the first direction (X direction), may be less than the sizes of conductive patterns 420 in the edge of the transparent substrate 410.

Referring to FIG. 10C, the sizes of conductive patterns 420 included in the mmW reflective structure 400*c* may increase in the first direction (X direction) and then decrease. Accordingly, the sizes of conductive patterns 420 in a center portion of a transparent substrate 410, in the first direction (X direction), may be greater than the sizes of conductive patterns 420 in the edge of the transparent substrate 410.

According to the inventive concept, a mmW reflective structure, a mmW reflection-directed structure, and a mmW transmission structure, which have low visual recognition and high transmittance of visible light, may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A millimeter-wave (mmW) reflective structure configured to reflect incident millimeter waves, the mmW reflective structure comprising:

a transparent substrate in which unit cells in the form of a matrix are defined, the transparent substrate having an upper surface parallel to first and second directions that are orthogonal to each other; and conductive patterns arranged in the unit cells on the transparent substrate, each of the conductive patterns having a hollow rectangular shape.

2. The mmW reflective structure of claim 1, wherein centers of the unit cells match centers of the conductive patterns.

3. The mmW reflective structure of claim 1, wherein each of the unit cells are square, wherein lengths of each of the unit cells in the first and second directions are about 3 mm to about 5 mm.

4. The mmW reflective structure of claim 1, wherein a size of each of the conductive patterns decreases in a first direction.

5. The mmW reflective structure of claim 1, wherein transmittance of visible light in the mmW reflective structure is about 70% or more.

6. A millimeter-wave (mmW) reflection-directed structure configured to direct incident millimeter waves in a set direction, the mmW reflection-directed structure comprising:

a transparent substrate in which unit cells positioned to form a matrix are defined, the transparent substrate having an upper surface parallel to first and second directions that are orthogonal to each other; and conductive patterns arranged in the unit cells, wherein the conductive patterns are formed in a mesh structure.

7. The mmW reflection-directed structure of claim 6, wherein each of the unit cells has edges parallel to the first direction or the second direction.

8. The mmW reflection-directed structure of claim 6, wherein each of the unit cells comprises a mesh region in which the conductive pattern is formed and a transparent region in which the conductive pattern is not formed.

9. The mmW reflection-directed structure of claim 8, wherein a width of the mesh region is about 0.1 mm to about 2.0 mm.

10. The mmW reflection-directed structure of claim 8, wherein lengths of the mesh region in the first and second directions are about 1.5 mm to about 5 mm.

11. The mmW reflection-directed structure of claim 10, wherein the mesh region is a hollow square region when viewed in a direction perpendicular to the transparent substrate.

12. The mmW reflection-directed structure of claim 8, wherein the conductive pattern comprises:

a plurality of first conductive lines inclined with respect to the first and second directions and parallel to each other; and a plurality of second conductive lines intersecting the plurality of first conductive lines and parallel to each other.

13. The mmW reflection-directed structure of claim 11, wherein vertical thicknesses of the plurality of first and second conductive lines are about 0.2 micrometers (μm) to about 2 μm.

14. The mmW reflection-directed structure of claim 11, wherein widths of the plurality of first and second conductive lines are about 1 μm to about 10 μm.

15. The mmW reflection-directed structure of claim 11, wherein the upper surface of the transparent substrate, which is surrounded and exposed by the plurality of first and second conductive lines, has a diamond shape.

16. The mmW reflection-directed structure of claim 15, wherein a length of the diamond shape in the first direction is about 200 μm to about 400 μm.

17. The mmW reflection-directed structure of claim 15, wherein a length of the diamond shape in the second direction is about 300 μm to about 1200 μm.

18. A millimeter-wave (mmW) transmission-directed structure configured to direct incident millimeter waves in a set direction, the mmW transmission-directed structure comprising:

a transparent substrate in which unit cells are defined in a matrix, the transparent substrate having an upper surface parallel to first and second directions which are orthogonal to each other; and conductive patterns respectively arranged in the unit cells and having a mesh structure, wherein a mesh region in which one of the conductive patterns is formed is defined in each of the unit cells, and an area ratio of the mesh region to each of the unit cells is about 50% or more.

19. The mmW transmission-directed structure of claim 18, wherein the mesh structure has a diamond shape.

20. The mmW transmission-directed structure of claim 18, wherein the mesh region occupies an edge and a central portion of each of the unit cells.

* * * * *